(12) United States Patent
Hayashi

(10) Patent No.: US 11,133,952 B2
(45) Date of Patent: Sep. 28, 2021

(54) NOTIFICATION CONTROL APPARATUS, DETECTION APPARATUS, NOTIFICATION CONTROL SYSTEM, NOTIFICATION CONTROL METHOD, AND DETECTION METHOD

(71) Applicant: SONY CORPORATION, Tokyo (JP)

(72) Inventor: Morihiko Hayashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 456 days.

(21) Appl. No.: 15/768,866

(22) PCT Filed: Sep. 26, 2016

(86) PCT No.: PCT/JP2016/078216
§ 371 (c)(1),
(2) Date: Apr. 17, 2018

(87) PCT Pub. No.: WO2017/077791
PCT Pub. Date: May 11, 2017

(65) Prior Publication Data
US 2020/0244475 A1 Jul. 30, 2020

(30) Foreign Application Priority Data
Nov. 2, 2015 (JP) .............................. JP2015-215622

(51) Int. Cl.
*H04L 12/28* (2006.01)
(52) U.S. Cl.
CPC ........ *H04L 12/2812* (2013.01); *H04L 12/282* (2013.01); *H04L 12/2818* (2013.01)

(58) Field of Classification Search
None
See application file for complete search history.

(56) References Cited

U.S. PATENT DOCUMENTS

| | | | | |
|---|---|---|---|---|
| 2003/0231259 A1* | 12/2003 | Yui | .................... | H04N 5/44504 348/564 |
| 2007/0101290 A1 | 5/2007 | Nakashima et al. | | |
| 2007/0273926 A1* | 11/2007 | Sugiyama | .............. | H04N 7/163 358/1.18 |

(Continued)

FOREIGN PATENT DOCUMENTS

| | | |
|---|---|---|
| CN | 1959349 A | 5/2007 |
| DE | 102006051428 A1 | 5/2007 |
| JP | 2007-121798 A | 5/2007 |

(Continued)

OTHER PUBLICATIONS

International Search Report and Written Opinion of PCT Application No. PCT/JP2016/078216, dated Nov. 29, 2016, 10 pages of ISRWO.

*Primary Examiner* — Cai Y Chen
(74) *Attorney, Agent, or Firm* — Chip Law Group

(57) ABSTRACT

Provided is a notification control apparatus that includes a receiving unit that receives detected information detected by a detection apparatus connected to a home network and priority information associated with the detected information from the detection apparatus via the home network. The notification control apparatus further includes a notification control unit that controls notification to a user by using a method based on the priority information.

15 Claims, 20 Drawing Sheets

(56) References Cited

U.S. PATENT DOCUMENTS

2014/0005809 A1\* 1/2014 Frei ........................ G08B 25/01
  700/90
2016/0380782 A1\* 12/2016 Tanaka ................ H04L 12/2818
  340/870.07

FOREIGN PATENT DOCUMENTS

| JP | 2008-004083 A | 1/2008 |
| JP | 2008-301377 A | 12/2008 |
| JP | 2009-043135 A | 2/2009 |

\* cited by examiner

| PRIORITY | NOTIFICATION METHOD |
|---|---|
| 1 | DISPLAY DETECTED INFORMATION ON ENTIRE SCREEN OF DISPLAY UNIT |
| 2 | DISPLAY DETECTED INFORMATION ON PART OF DISPLAY UNIT AS WINDOW |
| 3 | DISPLAY ICON INDICATING THAT THERE EXISTS DETECTED INFORMATION ON PART OF DISPLAY UNIT |
| 4 | DISPLAY DETECTED INFORMATION ON DISPLAY UNIT IN RESPONSE TO REQUEST FROM USER |

FIG. 6

| LARGE SEGMENT OF PRIORITY | SMALL SEGMENT OF PRIORITY | NOTIFICATION METHOD |
|---|---|---|
| 1 | SAME | DISPLAY WHILE DIVIDING WHOLE OF DISPLAY UNIT, OR, ALTERNATELY DISPLAY DETECTED INFORMATION ON WHOLE OF DISPLAY UNIT IN TIME-SHARING MANNER. |
| 1 | DIFFERENT | DISPLAY DETECTED INFORMATION WITH HIGHER PRIORITY ON WHOLE OF DISPLAY UNIT. DISPLAY DETECTED INFORMATION WITH LOWER PRIORITY ON PART OF DETECTED INFORMATION WITH HIGHER PRIORITY ON DISPLAY UNIT. |
| 2 | SAME | RESPECTIVELY DISPLAY PIECES OF DETECTED INFORMATION IN PARALLEL ON PART OF DISPLAY UNIT AS WINDOWS. |
| 2 | DIFFERENT | DISPLAY DETECTED INFORMATION WITH HIGHER PRIORITY ON PART OF DISPLAY UNIT AS WINDOW. DISPLAY DETECTED INFORMATION WITH LOWER PRIORITY AS WINDOW WHILE SUPERIMPOSING DETECTED INFORMATION WITH LOWER PRIORITY ON DETECTED INFORMATION WITH HIGHER PRIORITY ON PART OF DISPLAY UNIT. |
| 3 | SAME | DISPLAY ICONS INDICATING THAT THERE EXISTS DETECTED INFORMATION IN PARALLEL ON PART OF DISPLAY UNIT. |
| 3 | DIFFERENT | DISPLAY ICONS INDICATING THAT THERE EXISTS DETECTED INFORMATION IN PARALLEL ON PART OF DISPLAY UNIT. DISPOSE ICON OF DETECTED INFORMATION WITH HIGHER PRIORITY AT POSITION WHERE ICON OF DETECTED INFORMATION WITH HIGHER PRIORITY IS MORE PROMINENT THAN ICON OF DETECTED INFORMATION WITH LOWER PRIORITY. |
| 4 | SAME | DISPLAY IN RESPONSE TO REQUEST FROM USER. |
| 4 | DIFFERENT | |

520

NOTIFICATION CONTROL APPARATUS, DETECTION APPARATUS, NOTIFICATION CONTROL SYSTEM, NOTIFICATION CONTROL METHOD, AND DETECTION METHOD

CROSS REFERENCE TO RELATED APPLICATIONS

This application is a U.S. National Phase of International Patent Application No. PCT/JP2016/078216 filed on Sep. 26, 2016, which claims priority benefit of Japanese Patent Application No. JP 2015-215622 filed in the Japan Patent Office on Nov. 2, 2015. Each of the above-referenced applications is hereby incorporated herein by reference in its entirety.

TECHNICAL FIELD

The present disclosure relates to a notification control apparatus, a detection apparatus, a notification control system, a notification control method, and a detection method.

BACKGROUND ART

In recent years, a house equipped with a home network which connects electronic apparatuses such as home electric appliances at home, which is a so-called smart home, has attracted attention. In such a smart home, it is possible to operate each connected electronic apparatus including a fire-alarm box, a thermostat, a security camera and an intercom with a terminal and it is possible to monitor a state of each electronic apparatus with the terminal.

Patent Literature 1 discloses a display control apparatus which determines priority of a broadcast program which is being displayed and new display information and controls display operation of a display unit on the basis of the priority.

CITATION LIST

Patent Literature

Patent Literature 1: JP 2002-305695A

DISCLOSURE OF INVENTION

Technical Problem

However, in a smart home, various electronic apparatuses are appropriately connected and/or disconnected as needed. At the above-described operation terminal of the smart home, it is impossible to discern content of information obtained from such electronic apparatuses which are frequently connected and disconnected, and it is impossible to appropriately display information from the electronic apparatuses depending on the situation.

Further, the display control apparatus disclosed in Patent Literature 1 does not assume communication with electronic apparatuses such as home electric appliances in the first place. Still further, because this display control apparatus determines priority of information along content of a table which is stored in advance, when a new type of information is provided, it is difficult to determine priority.

Therefore, the present disclosure proposes a new and improved notification control apparatus, detection apparatus, notification control system, notification control method and detection method which enable flexible notification of information detected at various kinds of detection apparatuses connected to the home network to be made on the basis of priority in accordance with content of the information.

Solution to Problem

According to the present disclosure, there is provided a notification control apparatus including: a receiving unit configured to receive detected information detected by a detection apparatus connected to a home network and priority information associated with the detected information from the detection apparatus via the home network; and a notification control unit configured to control notification to a user by using a method in accordance with the priority information.

In addition, according to the present disclosure, there is provided a notification control method including: receiving detected information detected by a detection apparatus connected to a home network and priority information associated with the detection apparatus from the detection apparatus via the home network; and controlling notification to a user by a processor using a method in accordance with the priority information.

In addition, according to the present disclosure, there is provided a detection apparatus including: a detecting unit configured to detect information of surroundings as detected information; and a transmitting unit connected to a home network and configured to transmit the detected information and priority information associated with the detected information to a notification control apparatus via the home network. The notification control apparatus is configured to control notification of the detected information to the user by using a method in accordance with the priority information.

In addition, according to the present disclosure, there is provided a detection method including: detecting information of surroundings as detected information by a detecting unit; and transmitting the detected information and priority information associated with the detected information to a notification control apparatus via a home network. The notification control apparatus is configured to control notification of the detected information to a user by using a method in accordance with the priority information.

In addition, according to the present disclosure, there is provided a notification control system including: a home network; one or more detection apparatuses configured to detect information of surroundings as detected information and transmit the detected information and priority information associated with the detected information to the home network; and a notification control apparatus configured to receive the detected information from the detection apparatus via the home network and control notification to a user by using a method in accordance with the priority information.

Advantageous Effects of Invention

As described above, according to the present disclosure, it is possible to flexibly make a notification of information detected at various kinds of detection apparatuses connected to a home network on the basis of priority in accordance with content of the information.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is a table indicating relationship between the notification method and the priority of the detected information in the first embodiment of the present disclosure.

MODE(S) FOR CARRYING OUT THE INVENTION

Figure 1:
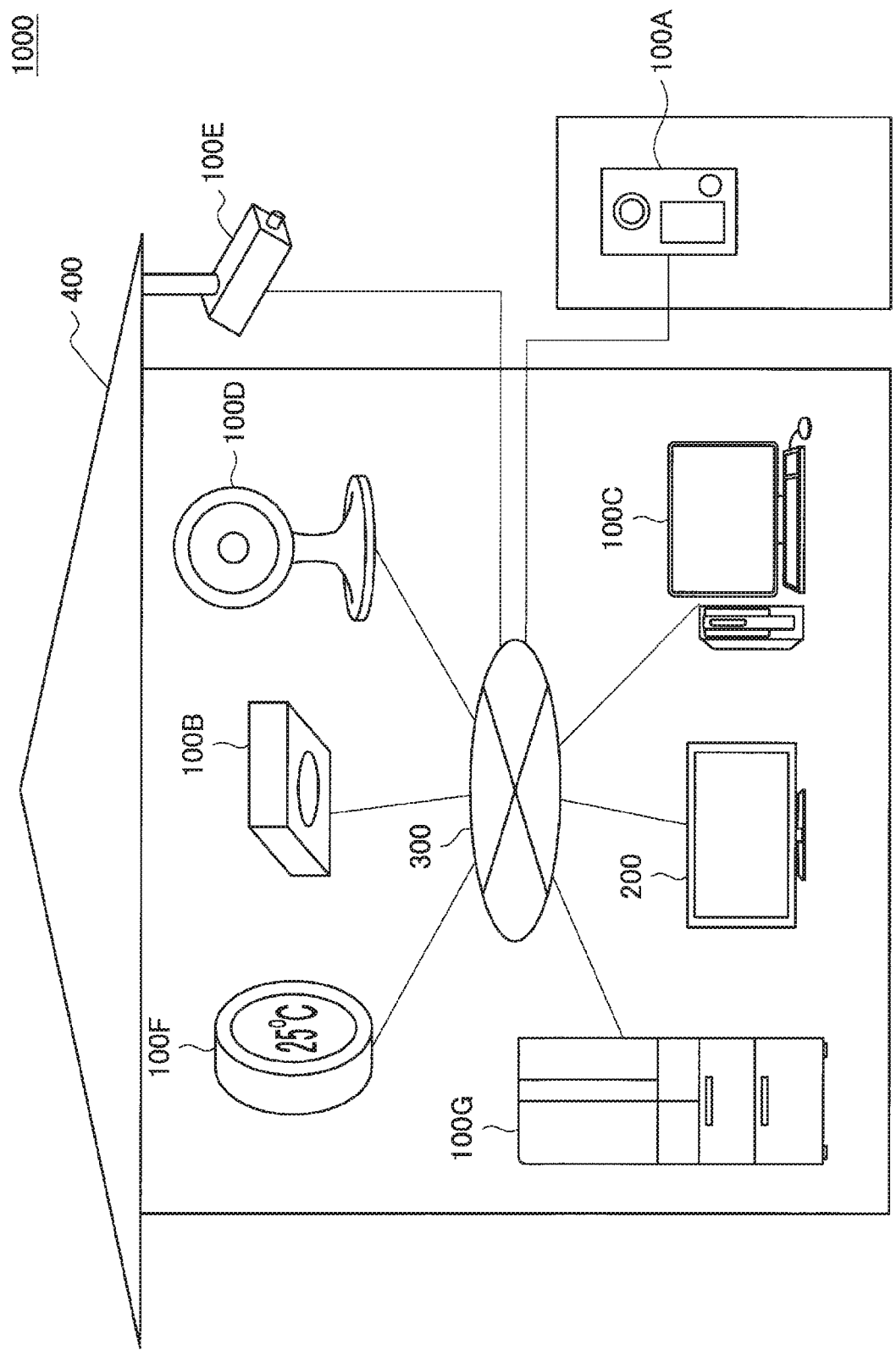
FIG. 1 is a schematic diagram illustrating appearance of a notification control system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted. Further, in the present specification and drawings, different alphabetical characters are added after the same reference numeral to distinguish among similar components. However, in the case where it is not necessary to particularly distinguish among a plurality of components having substantially the same functions and configuration, only the same reference numeral is added.

Note that description will be provided in the following order.
1. First embodiment (television receiver)
1.1. Example of appearance of notification control system
1.2. Configuration of detection apparatus
1.3. Configuration of notification control apparatus
1.4. Flow of detection method and notification control method
2. Second embodiment (smartphone)
3. Modified examples
4. Hardware configuration of detection apparatus
5. Hardware configuration of notification control apparatus
6. Computer program

1. First Embodiment

[1.1. Example of Appearance of Notification Control System]

First, a schematic configuration of a notification control system according to an embodiment of the present disclosure will be described with reference to FIG. 1. FIG. 1 is a schematic diagram illustrating appearance of a notification control system according to a first embodiment of the present disclosure.

As illustrated in FIG. 1, the notification control system 1000 includes detection apparatuses 100A to 100G, a notification control apparatus 200 and a home network 300.

The detection apparatuses 100A to 100G are electronic apparatuses which can detect information of surroundings. Further, the detection apparatuses 100A to 100G can transmit the detected information to the notification control apparatus 200 via the home network 300.

Specifically, the detection apparatus 100A is an intercom including a sensor camera, and can transmit video information detected by the sensor camera. The detection apparatus 100B is a fire-alarm box and can sense heat, smoke or flame occurring by a fire to obtain fire information and transmit the fire information. The detection apparatus C is a desktop computer and can detect reception of an e-mail, or the like, and transmit e-mail information. The detection apparatus 100D is an indoor type security camera and can acquire video of surroundings of an installation location inside a house 400 and transmit the video of the surroundings of the installation location inside the house 400. The detection apparatus 100E is an outdoor type security camera and can acquire video of surroundings of an installation location outside the house 400 and transmit the video of the surroundings of the installation location outside the house 400. The detection apparatus F is a thermostat and can control a temperature inside the house 400, detect the temperature and humidity inside the house 400 and transmit information of the detected temperature and humidity. The detection apparatus 100G is a refrigerator-freezer, and can detect temperature information and setting information inside the refrigerator-freezer and transmit the temperature information and the setting information. Note that, in the present embodiment, the detection apparatus is not limited to aspects which are illustrated, and can be any electronic apparatus which can be connected to the home network 300, for example, domestic electric appliances.

The notification control apparatus 200 is a television receiver which can be connected to the home network 300. The notification control apparatus 200 can receive detected information from the detection apparatuses 100A to 100G via the home network 300. Further, the notification control apparatus 200 controls notification apparatuses such as a display unit 206 and a speaker 208 which will be described later so that a user is notified of the received detected information. Note that, as will be described later, in the present embodiment, the notification control apparatus 200 includes the display unit 206, the speaker 208, or the like, as the notification apparatuses, and notifies the user of the received detected information using these notification apparatuses.

The home network 300 is, for example, a wired and/or a wireless small local area network (LAN) complying with standards such as Ethernet (registered trademark). Further, the home network 300 is deployed over inside of the house 400 and the surroundings of the house 400 and connects the detection apparatuses 100A to 100G inside and outside the house 400 and the notification control apparatus 200.

Note that the home network 300 is not limited to the aspect which is illustrated, and may be deployed over a plurality of houses. Further, the home network 300 does not necessarily have to be a domestic network, and may be, for example, deployed at a small-scale facility, part of the facility, or the like, of organization such as entity.

[1.2. Configuration of Detection Apparatus]

A configuration of the detection apparatuses 100A to 100G will be described next. Note that the detection apparatuses 100A to 100G have different basic functions as the electronic apparatuses, but have a common configuration of transmitting the detected information. Therefore, the configuration relating to the detected information of the detection apparatus 100A will be mainly described as a typical example.

Figure 2:
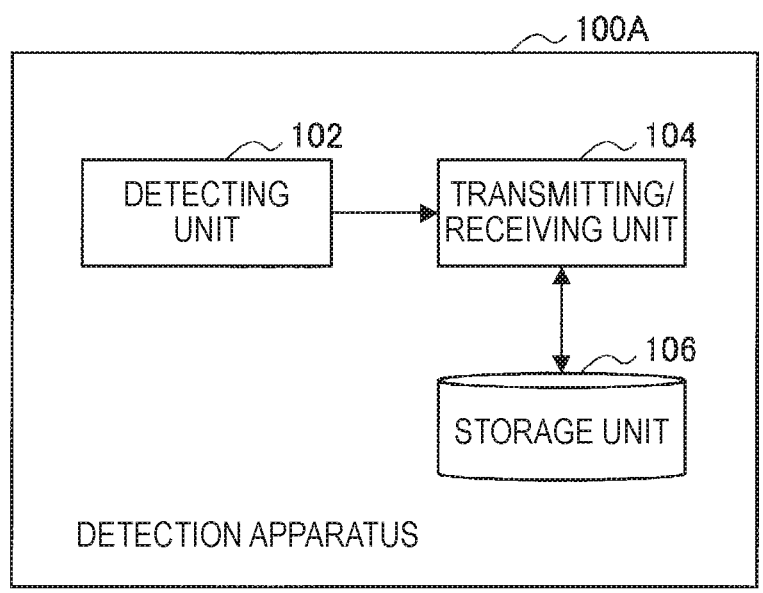
FIG. 2 is a block diagram illustrating main components of a detection apparatus according to the first embodiment of the present disclosure.
Figure 3:
FIG. 3 is a table indicating relationship between property of detected information and priority corresponding to the property of the detected information.

FIG. 2 is a block diagram illustrating main components of the detection apparatus 100A according to the present embodiment. FIG. 3 is a table indicating relationship between property of the detected information and priority corresponding to the property of the detected information. The detection apparatus 100A illustrated in FIG. 2 is an intercom disposed at an entrance of the house 400. The detection apparatus 100A includes a detecting unit 102, a transmitting/receiving unit 104 and a storage unit 106. Note that the configuration of the detection apparatus according to the present disclosure is not limited to the illustrated configuration example. For example, it is also possible to employ a configuration where each component such as the detecting unit, the transmitting/receiving unit and the storage unit is independent or it is also possible to configure the detecting unit so as to be able to detect a plurality of different types of information.

The detecting unit 102, which is configured with a sensor camera, identifies moving entity such as a person appearing near the detection apparatus 100 and captures an image of the entity. The captured image may be a still image or a moving image. The detecting unit 102 inputs the captured image of a visitor, or the like, who visits the entrance to the transmitting/receiving unit 104 as the detected information. Note that whether or not the image of the entrance is captured upon visit of a visitor is determined in accordance with whether or not there is pressure on a push button provided at the detection apparatus 100A as an intercom. When the push button is depressed, the detecting unit 102 judges the captured image as an image which can include a visitor who visits the entrance. With such a detecting unit 102, the detection apparatus 100A can, for example, detect information relating to a call by the visitor who visits the entrance.

The transmitting/receiving unit 104, which is connected to the home network 300, can communicate with an electronic apparatus such as the notification control apparatus 200 via the home network 300. Specifically, the transmitting/receiving unit 104 inputs information received via the home network 300 to each unit of the detection apparatus 100A. Meanwhile, when information is input from each unit of the detection apparatus 100A, the transmitting/receiving unit 104 transmits the information to a target electronic apparatus via the home network 300. For example, when the detected information is input from the detecting unit 102, the transmitting/receiving unit 104 reads out priority information from the storage unit 106 and transmits the detected information and the priority information to the notification control apparatus 200.

The storage unit 106 stores the priority information and information necessary for controlling the detection apparatus 100A. The storage unit 106 inputs the priority information to the transmitting/receiving unit 104 in response to a request from the transmitting/receiving unit 104.

Here, the priority information will be described in detail. In the present embodiment, the priority information is set for each of the detection apparatuses 100A to 100G. The priority information indicates priority indicating how much degree of priority is given to notification of the detected information detected by the detection apparatuses 100A to 100G over other operation of the notification control apparatus 200 upon control of notification at the notification control apparatus 200. Therefore, the priority information set for each of the detection apparatuses 100A to 100G is accordingly associated with the detected information detected at the detection apparatuses 100A to 100G.

In the present embodiment, as indicated in a table 500 indicated in FIG. 3, the priority is segmented into a plurality of levels in advance on the basis of property of the detected information. In FIG. 3, "priority 1" (second priority) is allocated to detected information which requires emergency evacuation and/or response, "priority 2" (first priority) is allocated to detected information which requires an immediate response, "priority 3" (first priority) is allocated to detected information to which a user should give a response when the user has time to spare, and "priority 4" (third priority) is allocated to detected information of which the user should be notified as necessary, as large segments (first segments) of the priority. Further, the above-described priority is set higher as the number added to the priority is smaller. Further, even in the same large segment, each priority is classified into small segments (second segments) such as A, B and C in accordance with importance and urgency of the detected information.

Further, the priority is set for each of the detection apparatuses 100A to 100G in advance. For example, priority 2 (A) corresponding to entrance call information is allocated to priority information at the detection apparatus 100A on the basis of the table 500. Note that, in the present disclosure, the priority may be set so as to be changeable by the user to support a case where the priority order differs in accordance with an installation location or the like.

In the present embodiment, each of the detection apparatuses 100A to 100G has priority information including priority in this manner. Further, by the detection apparatuses 100A to 100G transmitting the priority information to the notification control apparatus 200 along with the detected information, the notification control apparatus 200 can recognize priority of the detected information.

As a comparison example of the notification control apparatus 200 according to the present embodiment, there is a notification control apparatus which determines priority of the detected information by itself. However, typically, in the home network, connection and disconnection of electronic apparatuses and new introduction of electronic apparatuses are frequently performed. The notification control apparatus in the comparison example cannot judge priority of information received from each electronic apparatus such as, for example, an electronic apparatus which is newly introduced. In contrast, in the notification control system 1000 according to the present embodiment, by each of the detection apparatuses 100A to 100G transmitting the priority information to the notification control apparatus 200 along with the detected information, the notification control apparatus 200 can easily recognize priority of the detected information. By this means, also in the case where detection apparatuses are introduced and connected in the notification control system 1000, the notification control apparatus 200 can make a notification corresponding to the detected information transmitted from each detection apparatus without making special setting.

Note that it goes without saying that the detection apparatuses 100A to 100G have components and functions corresponding to original purpose as each electronic apparatus in addition to the above-described components.

[1.3. Configuration of Notification Control Apparatus]

Figures 4, 5:
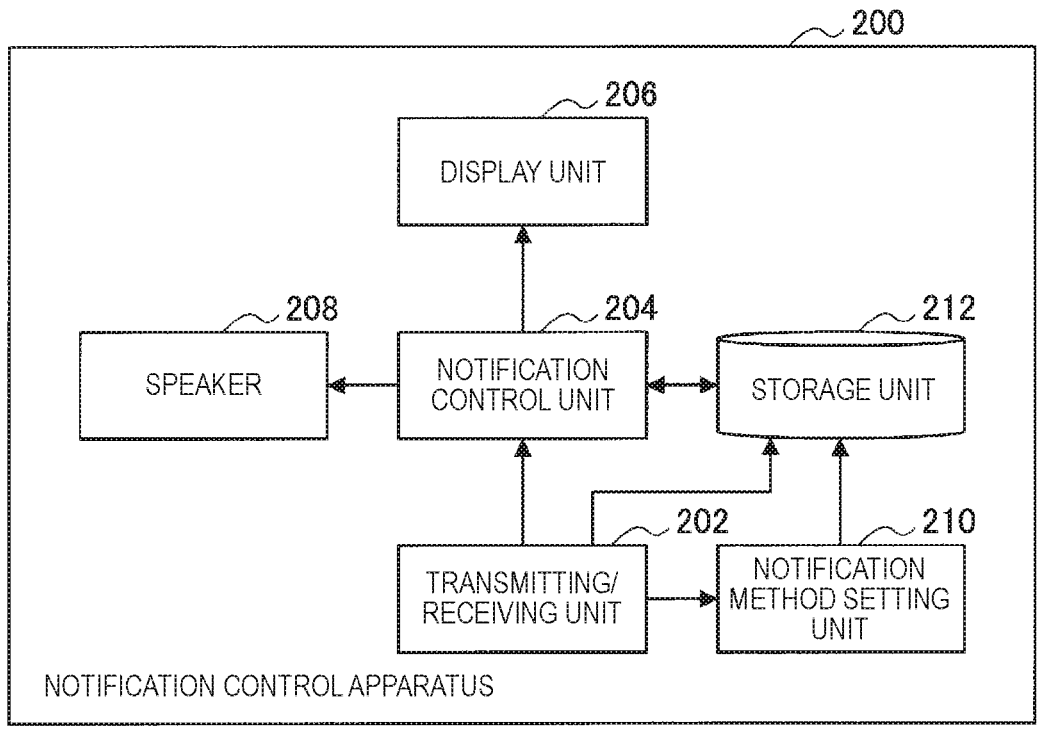
FIG. 4 is a block diagram illustrating main components of a notification control apparatus according to the first embodiment of the present disclosure.
FIG. 5 is a table indicating relationship between a notification method and priority of the detected information in the first embodiment of the present disclosure.

A configuration of the notification control apparatus 200 will be described next. FIG. 4 is a block diagram illustrating main components of the notification control apparatus illustrated in FIG. 1. FIG. 5 and FIG. 6 are tables indicating relationship between a notification method and priority of the detected information in the present embodiment. FIG. 7 to FIG. 12 are diagrams illustrating examples of display of the detected information in the present embodiment. As illustrated in FIG. 4, the notification control apparatus 200 includes a transmitting/receiving unit 202, a notification control unit 204, a display unit 206, a speaker 208, a notification method installation unit 210 and a storage unit 212.

The transmitting/receiving unit 202 is connected to the home network 300 and can communicate with electronic apparatuses such as the detection apparatuses 100A to 100G via the home network 300. Specifically, the transmitting/receiving unit 202 inputs information received via the home network 300 to each unit of the notification control apparatus 200. Meanwhile, when information is input from each unit of the notification control apparatus 200, the transmitting/receiving unit 202 transmits the input information to a target electronic apparatus via the home network 300. Then, when the detected information and the priority information are received from the detection apparatuses 100A to 100G, the transmitting/receiving unit 202 inputs the detected information and the priority information to the notification control unit 204. Further, when the transmitting/receiving unit 202 receives a setting change instruction of a notification method relating to the detected information from a user via, for example, a control apparatus (not illustrated), the transmitting/receiving unit 202 inputs the setting change instruction to the notification method setting unit 210.

The notification control unit 204 controls the display unit 206 and the speaker 208 to notify the user of the detected information input from the transmitting/receiving unit 202 using a method in accordance with the priority information received from the detection apparatuses 100A to 100G. Specifically, when the notification control unit 204 acquires the detected information and the priority information, the notification control unit 204 reads out a table 510 and a table 520 indicated in FIG. 5 and FIG. 6 from the storage unit 212. Subsequently, the notification control unit 204 determines the notification method of the detected information from priority included in the priority information with reference to correspondence between the priority and the notification method described in the table 510 and the table 520. The notification control unit 204 then controls the display unit 206 and the speaker 208 to make a notification of the detected information in accordance with the determined notification method. Specific notification method and method for determining the notification method will be described in detail later.

The display unit 206, which is a so-called display, displays television pictures obtained by a decoder (tuner, not illustrated) provided at the notification control apparatus 200 receiving radio waves of television broadcast and converting the radio waves. Meanwhile, the display unit 206 displays the detected information as an image such as a moving image and/or a still image by an instruction from the notification control unit 204.

The speaker 208, which is an apparatus for generating sound waves, generates television sound, or the like, obtained at the decoder (not illustrated). Meanwhile, the speaker 208 makes a notification of the detected information using sound by an instruction from the notification control unit 204.

Here, the notification method of the detected information and a method for determining the notification method will be described. Note that, because there is also a case where a plurality of pieces of the detected information to be notified exist as well as a case where there is one piece of the detected information to be notified, the notification method and the method for determining the notification method will be described below for each of these cases.

(Case where there is One Piece of Detected Information)

In the case where there is one piece of the detected information to be notified, the notification control apparatus 200 determines the notification method in accordance with a large segment of the priority. Specifically, in the case where the priority information includes priority 2 or 3 (first priority), the notification control unit 204 controls notification to the user so that an image relating to the detected information or an image indicating existence of the detected information is displayed on part of a screen of the display unit 206. Further, in the case where the priority information includes priority 1 (second priority), the notification control unit 204 controls notification to the user so that an image relating to the detected information, which is larger than that in the case where the priority information includes priority 2 or 3 (first priority), is displayed on the display unit 206. Still further, in the case where the priority information includes priority 4 (third priority), the notification control unit 204 controls notification to the user so that the image relating to the detected information is displayed on the display unit 206 when the transmitting/receiving unit 202 receives a request for display from the user. More specifically, in the present embodiment, as illustrated in FIG. 5, in the table 510, priority indicated by the priority information transmitted along with the detected information is associated with the notification method. Then, notification of the detected information is made as described below using the notification method associated with the priority.

In a case of priority 1, the notification method is determined so that the detected information is displayed on an entire screen of the display unit 206. In this case, normal operation of the display unit 206 at the notification control apparatus 200, that is, display of television pictures is stopped. Further, in this notification method, the speaker 208 may stop generation of television sound and make a notification of the detected information using sound, sound effect, or the like. A specific example is illustrated in FIG. 7.

Figure 7:
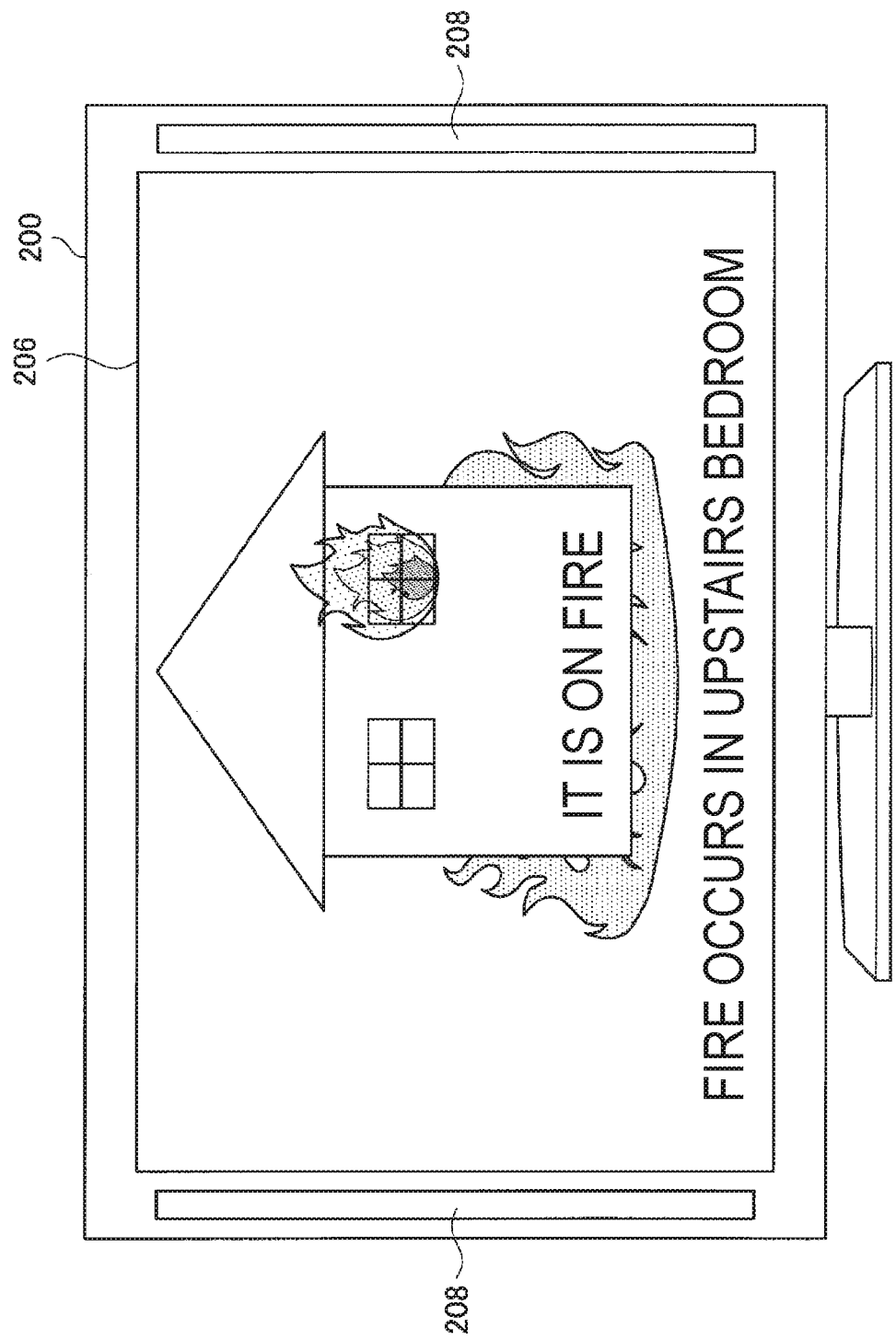
FIG. 7 is a diagram illustrating an example of display of the detected information in the first embodiment of the present disclosure.

In the example illustrated in FIG. 7, the detected information is fire information detected by the detection apparatus 100B which is a fire-alarm box. The priority of the fire information is priority 1 from the table 500. Therefore, the display unit 206 displays information relating to the fire information on an entire screen of the display unit 206 by the instruction from the notification control unit 204. Further, the speaker 208 stops television sound as needed and makes a notification of the fire information using sound or alarm sound.

Subsequently, in a case of priority 2, as indicated in the table 510 in FIG. 5, the notification method is determined so that the detected information is displayed on part of the display unit 206 as a window image. In this case, normal operation of the display unit 206 and display of television pictures are continued. Further, in this notification method, the speaker 208 may superimpose sound, sound effect, or the like, of the detected information on television sound to make a notification while continuing generation of the television sound. A specific example is illustrated in FIG. 8.

Figure 8:
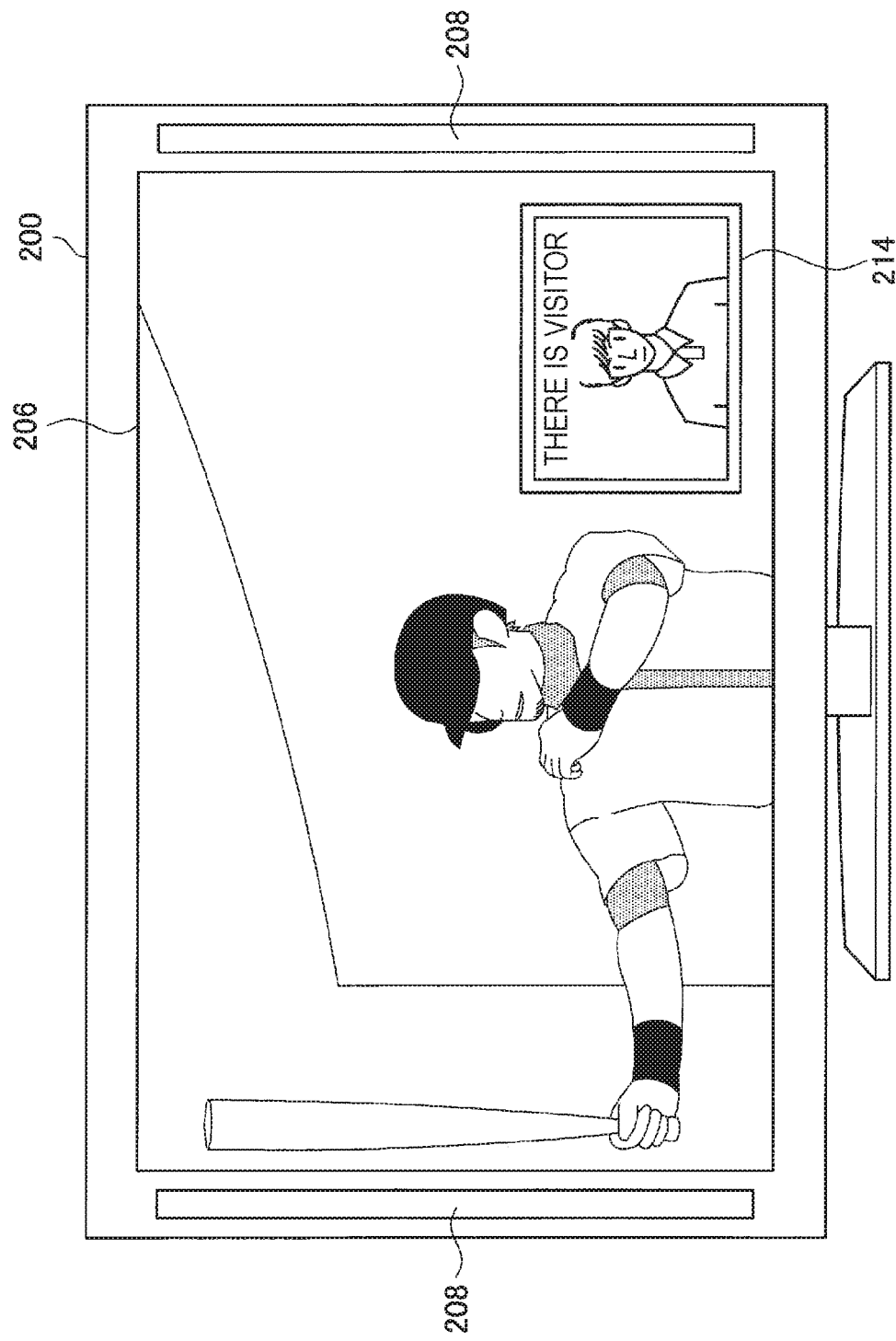
FIG. 8 is a diagram illustrating an example of display of the detected information in the first embodiment of the present disclosure.

In the example illustrated in FIG. 8, the detected information is video relating to a call at the entrance detected by the detection apparatus 100A which is an intercom. The priority of such video relating to the call is priority 2 from the table 500. Therefore, the display unit 206 displays video relating to the call on part of the display unit 206 as a window image 214 which is superimposed on television pictures while continuing display of the television pictures by the instruction from the notification control unit 204. Further, the speaker 208 superimposes sound or alarm sound of the information relating to the call on television sound to make a notification while lowering the volume of the television sound as needed.

Subsequently, in a case of priority 3, as indicated in the table 510 in FIG. 5, the notification method is determined so that an icon image indicating existence of the detected information is displayed on part of the display unit 206. In this case, normal operation of the display unit 206 and display of television pictures are continued. Further, in this notification method, the speaker 208 continues generation of television sound. However, the speaker 208 may superimpose sound effect, or the like, of the detected information on the television sound to make a notification. A specific example is illustrated in FIG. 9.

Figure 9:
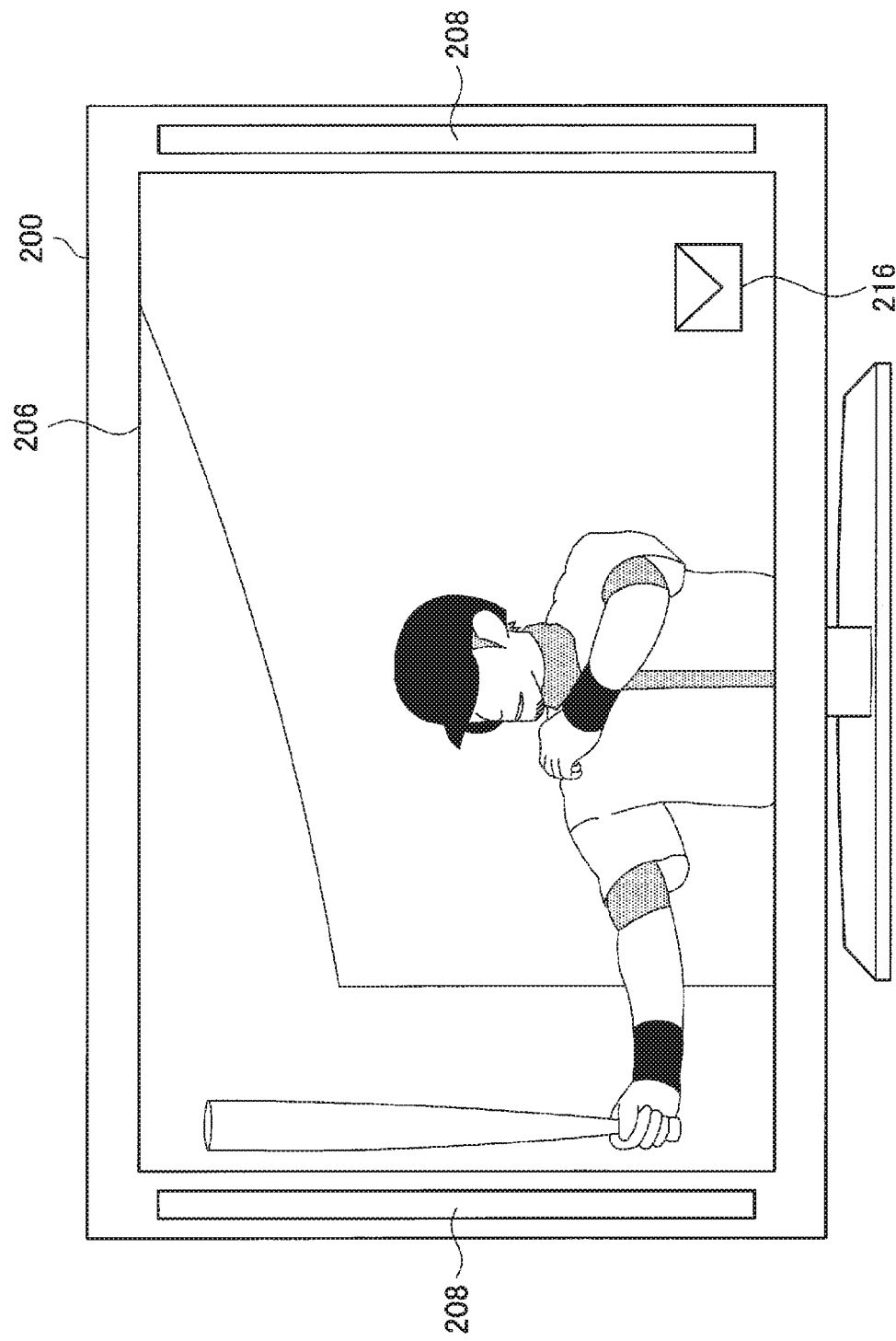
FIG. 9 is a diagram illustrating an example of display of the detected information in the first embodiment of the present disclosure.

In the example illustrated in FIG. 9, the detected information is e-mail information concerning reception of an e-mail detected by the detection apparatus 100C which is a desktop computer. Priority of such e-mail information relating to reception of an e-mail is priority 3 from the table 500. The display unit 6 displays information relating to reception of an e-mail on part of the display unit 6 as an icon image 216 which is superimposed on television pictures while continuing display of the television pictures by an instruction from the notification control unit 204. Further, the speaker 208 continues television sound and does not make a notification of the e-mail information using sound.

Note that a user who recognizes the icon image 216 displayed in this manner can display content of the received e-mail at the display unit 206 by operating the notification control apparatus 200 using input means (not illustrated) as appropriate.

Subsequently, in a case of priority 4, as indicated in the table 510 in FIG. 5, the notification method is determined so that the detected information is displayed at the display unit 206 in response to a request from the user. That is, in this case, in the case where there the user does not make a request, the detected information is not displayed on the display unit 206. Further, normal operation of the display unit 6 and display of television pictures are continued. Still further, the speaker 208 continues generation of television sound. Meanwhile, in the case where the user requests for display of the detected information by operating the notification control apparatus 200 using input means, the detected information is displayed on part of the display unit 206 as, for example, a window image.

(Case where there are a Plurality of Pieces of Detected Information)

Also in the case where there are a plurality of pieces of detected information to be notified, basically, the notification control unit 204 controls notification to the user using a method in accordance with priority of each piece of the detected information. Specifically, the notification control unit 204 controls notification to the user so that an image relating to detected information with higher priority is displayed at a larger size than a size of an image relating to detected information with lower priority. Meanwhile, in the case where priority included in the priority information corresponding to a plurality of pieces of detected information is the same, the notification control unit 206 controls notification to the user so that images of the plurality of pieces of detected information are displayed in parallel.

In the present embodiment, in the case where the notification control apparatus 200 receives a plurality of pieces of detected information, first, large segments of priority included in each piece of the priority information associated with each piece of the detected information are compared. Then, in the case where large segments of the priority are different, the notification control unit 204 controls the display unit 206 and the speaker 208 so as to make a notification of each piece of the detected information using a notification method corresponding to each piece of priority indicated in the table 510 in FIG. 5. In this case, at the display unit 206, images displayed in accordance with each piece of the priority are superimposed and displayed. In this case, an image relating to detected information with higher priority is displayed at a larger size than a size of an image relating to detected information with lower priority.

Meanwhile, in the case where large segments of the priority are the same, the notification control unit 204 controls the display unit 206 and the speaker 208 so as to make a notification of each piece of detected information in accordance with a notification method described in the table 520 indicated in FIG. 6.

For example, in the case where large segments of the priority are both 1, and small segments are the same, the notification control unit 204 controls the display unit 206 so that the whole of the display unit 206 is divided to display a plurality of pieces of detected information. Alternatively, the notification control unit 204 may control the display unit 206 so that the pieces of the detected information are alternately displayed on the whole of the display unit 206 in a time-sharing manner. A specific example is illustrated in FIG. 10.

Figure 10:
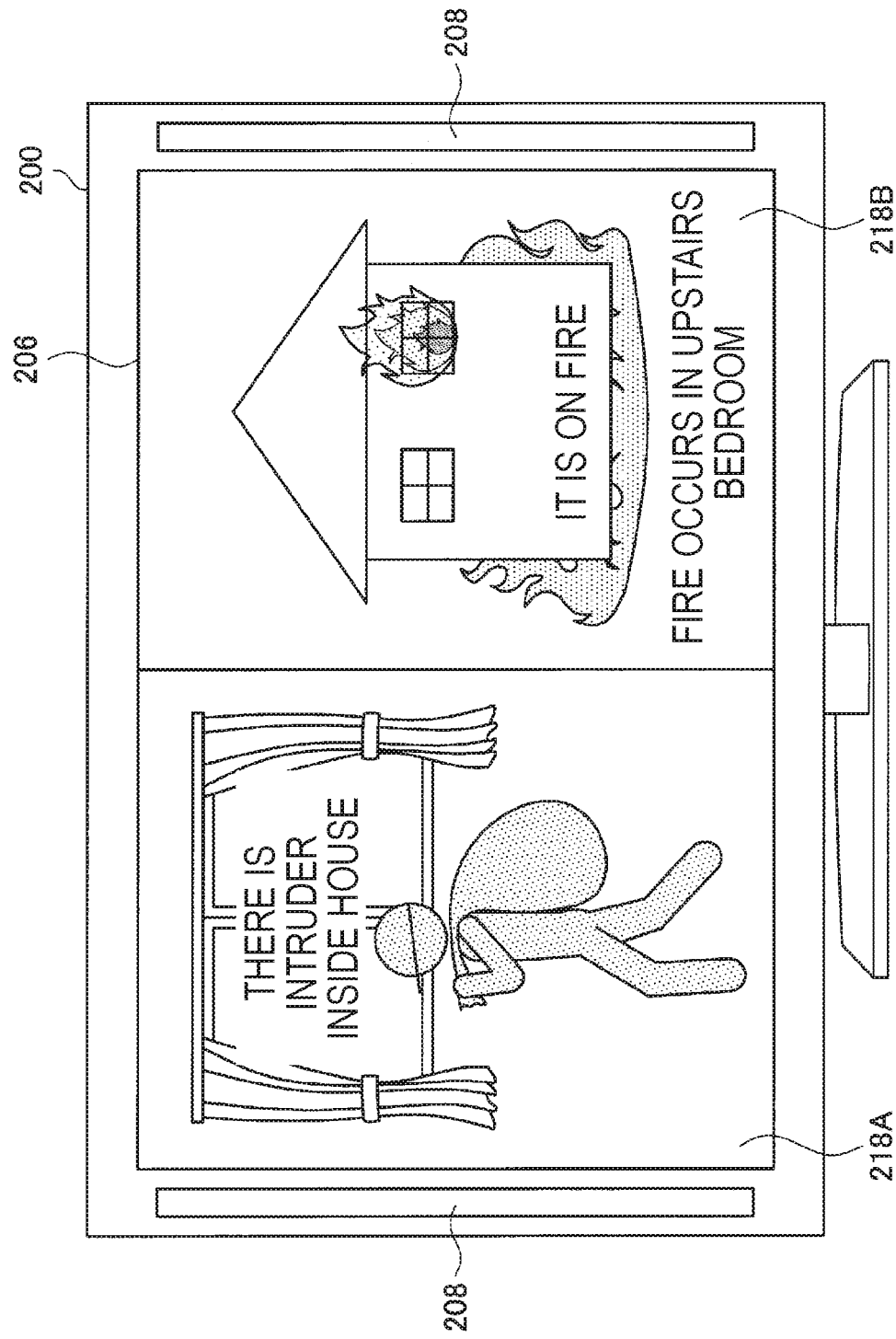
FIG. 10 is a diagram illustrating an example of display of the detected information in the first embodiment of the present disclosure.

In the example illustrated in FIG. 10, the detected information is fire information detected by the detection apparatus 100B which is an fire-alarm box and information relating to intrusion of a person into a house, detected by the detection apparatus 100D which is a security camera. Priority of such detected information is both priority 1 (A) from the table 500. Therefore, the notification control unit 204 controls the display unit 206 so that the whole of the display unit 206 is divided into equal areas and the information relating to intrusion of a person is displayed in a divided screen 218A and the fire information is displayed in a divided screen 218B. Further, the speaker 208 may stop television sound as needed and alternately make a notification of the information relating to intrusion of a person and the fire information using sound.

Further, in the case where large segments of the priority are both 1 and small segments are different, the notification control unit 204 controls the display unit 206 so that detected information with higher priority is displayed on the whole of the display unit 206 and detected information with lower priority is displayed on part of the detected information with higher priority. A specific example is illustrated in FIG. 11.

Figure 11:
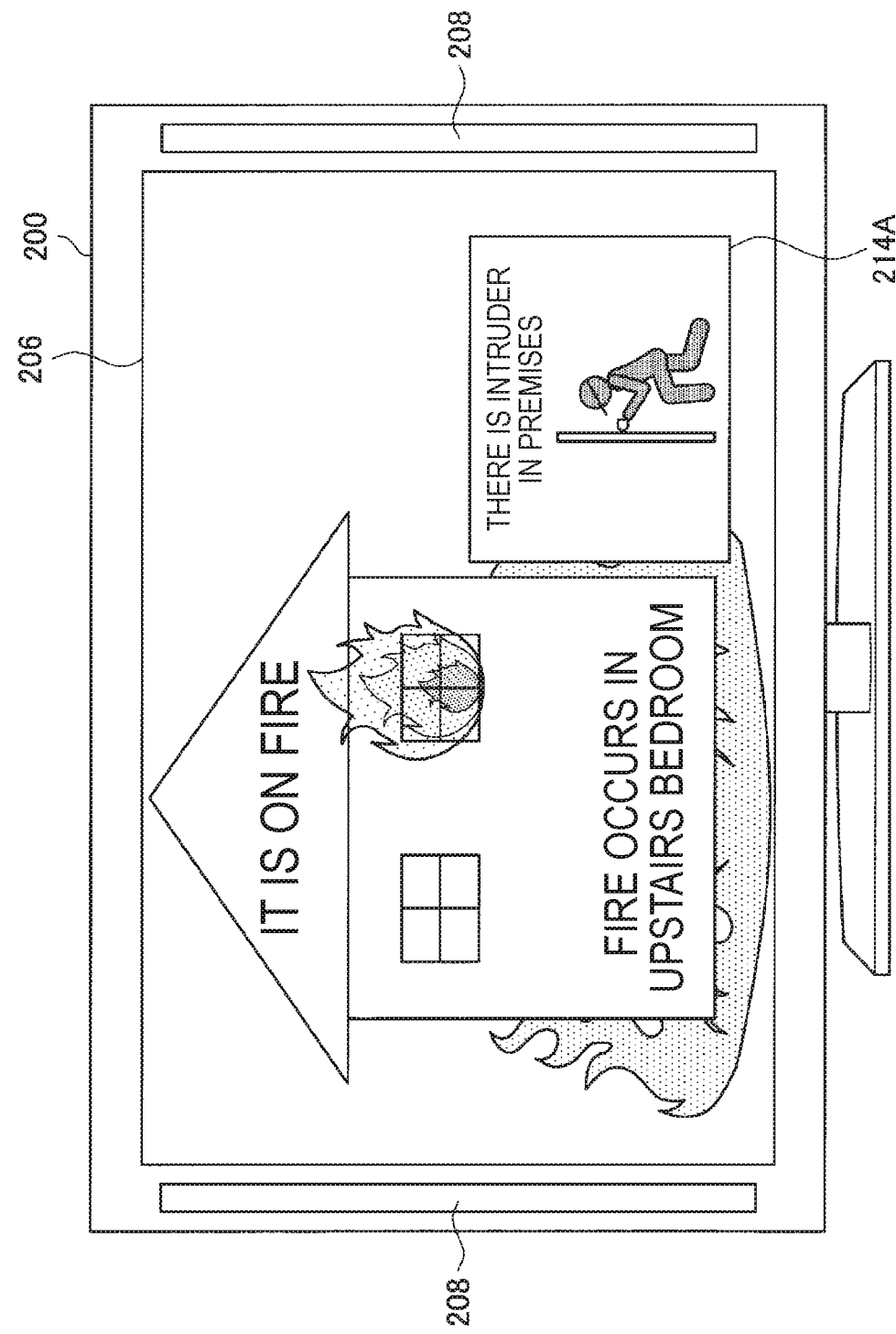
FIG. 11 is a diagram illustrating an example of display of the detected information in the first embodiment of the present disclosure.

In the example illustrated in FIG. 11, the detected information is fire information detected by the detection apparatus 100B which is a fire-alarm box and information relating to intrusion of a person into premises detected by the detection apparatus 100E which is an outdoor security camera. Priority of the fire information is priority 1 (A) from the table 500. Meanwhile, priority of the information relating to intrusion of a person into premises is priority 1 (B) from the table 500. Therefore, while large segments of the priority of the above-described fire information and information relating to intrusion of a person into premises are both 1, small segments are different. Further, priority relating to notification for the fire information is relatively higher than the information relating to intrusion of a person into premises.

As described above, the notification control unit 204 displays an image relating to the fire information in an entire screen of the display unit 206 and displays a window image 214A indicating the information relating to intrusion of a person into premises on part of the display unit 206 while superimposing the window image 214A on the image relating to the fire information. In this case, a display area of the window image 214A is set smaller than a display area (except a superimposed portion) of the image relating to the fire information.

In the case where large segments of the priority are both 2 and small segments are the same, the notification control unit 204 controls the display unit 206 so that window images relating to the detected information are displayed in parallel. In the case where large segments of the priority are both 2 and small segments are different, the notification control unit 204 controls the display unit so that a window image of the detected information with high priority in small segments is displayed and a window image of the detected information with low priority is displayed while the window of the detected information with low priority is superimposed on the window image of the detected information with high priority. In this case, a display area of the window image of the detected information with higher priority can be made larger than a display area of the window image of the detected information with lower priority.

In the case where large segments of the priority are both 3 and small segments are the same, the notification control unit 204 controls the display unit 206 so that icon images relating to the detected information are displayed in parallel.

Figure 12:
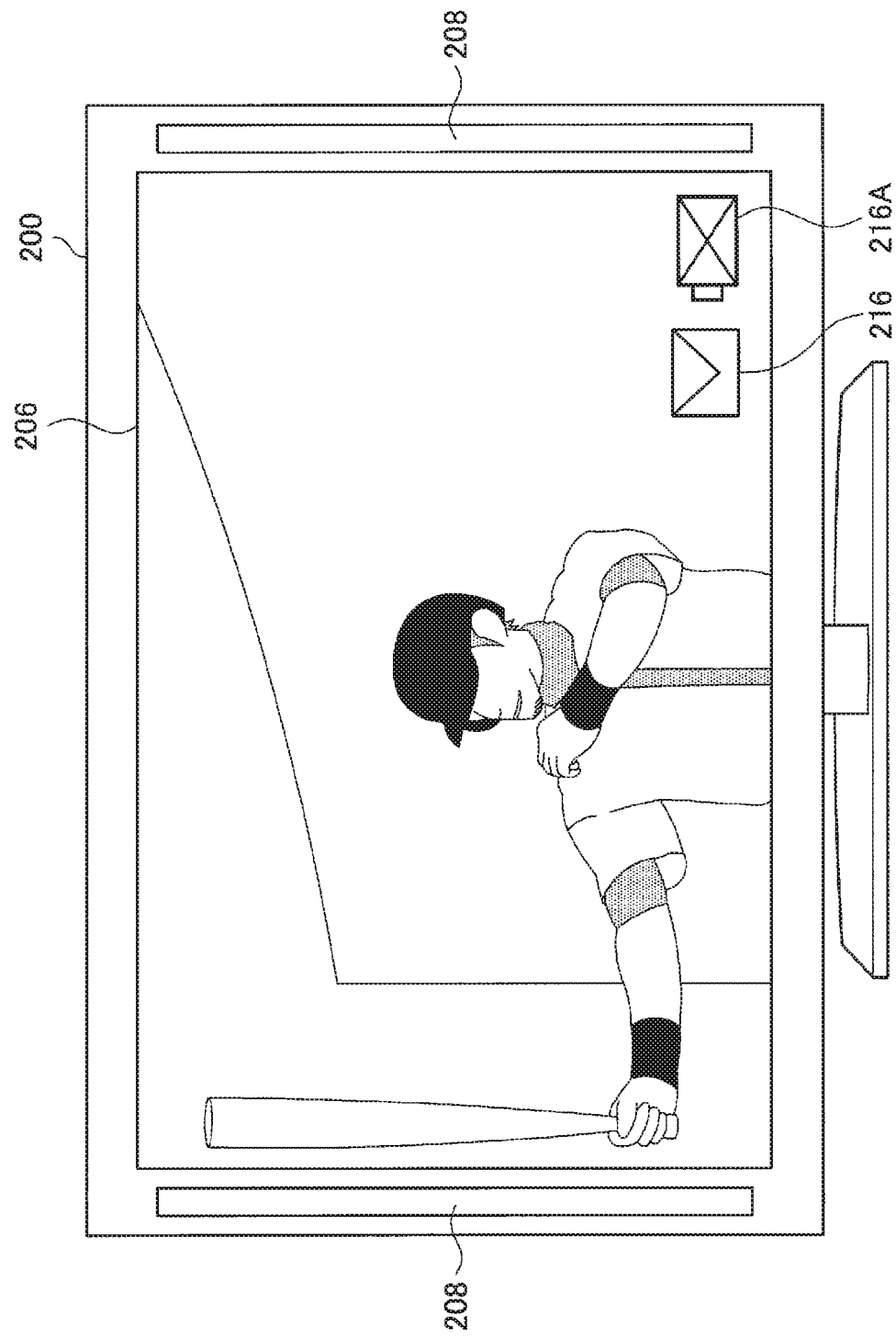
FIG. 12 is a diagram illustrating an example of display of the detected information in the first embodiment of the present disclosure.

Meanwhile, in the case where large segments of the priority are both 3 and small segments are different, the notification control unit 204 controls the display unit 206 to display icon images in parallel so that an icon image of detected information with high priority is more prominent than an icon image with low priority. Specifically, for example, as illustrated in FIG. 12, an icon image 216 relating to e-mail reception which is priority 3 (B) is disposed at a left side where the icon image 216 is more viewable than an icon image 216A relating to an alarm of a dead battery which is priority 3 (C).

Further, in the case where large segments of the priority are 4, normally, detected information is not displayed on the display unit 206. Therefore, the notification control unit 204 controls the display unit 206 so as not to display detected information regardless of whether small segments are different or the same and so as to display detected information only in response to a request from the user.

The notification method setting unit 210 sets the notification method of the detected information in accordance with the priority and inputs correspondence between the priority and the notification method in the storage unit 212. Setting of the notification method by the notification method setting unit 210 is started by a setting change instruction being acquired. The setting change instruction is, for example, input to the notification method setting unit 210 via the home network 300 and the transmitting/receiving unit 202 from a control apparatus (not illustrated) in response to operation by the user. The setting change instruction may be input to the notification method setting unit 210 by being input at an input apparatus (not illustrated) provided at the notification control apparatus 200.

Further, in the case where the notification method setting unit 210 sets the notification method of the detected information, the table 510 and the table 520 stored in the storage unit 212 are updated so that setting change of the notification method is reflected.

Setting examples of the notification method can include, for example, setting so that the detected information is displayed as an icon image for the notification method of the detected information corresponding to priority 2, setting so that lamp display is performed for the notification method of the detected information corresponding to priority 4, or the like.

The storage unit 212 stores information necessary for operation of the notification control apparatus 200. For example, the storage unit 212 stores the above-described tables 510 and 520, information relating to the detection apparatuses 100A to 100G, and information of a program, or the like, necessary for operation of each unit of the notification control apparatus 200. The storage unit 212 transmits information necessary for each unit on request.

Note that it goes without saying that the notification control apparatus 200 has components and functions corresponding to original purpose as a television receiver in addition to the above-described components.

As described above, the notification control apparatus 200 acquires the priority information along with the detected information via the home network 300. Then, it is possible to notify the user using a method in accordance with the priority information associated with the detected information. Further, because such a notification control apparatus 200 does not determine priority of the detected information by itself, also in the case where a detection apparatus is newly installed later, it is possible to flexibly make a notification of the detected information at the detection apparatus.

[1.3. Flow of Operation of Detection Apparatus and Notification Control Apparatus]

Figure 13:
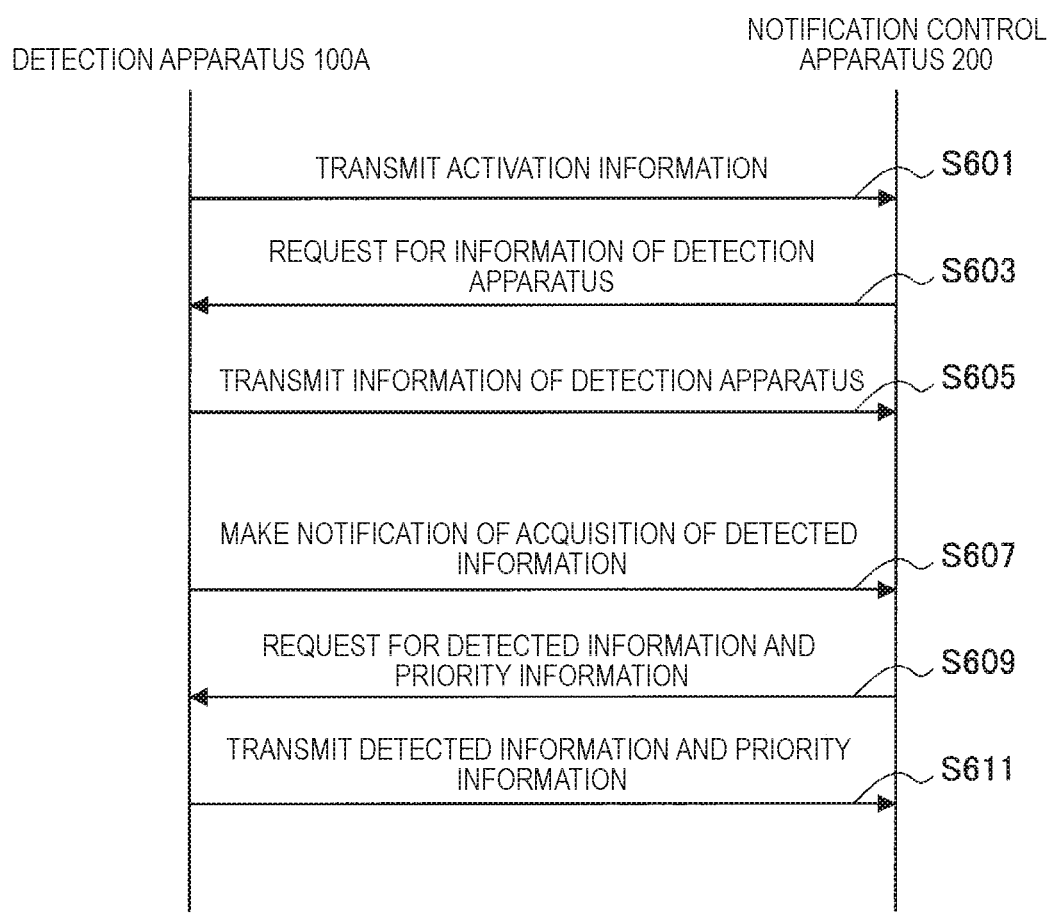
FIG. 13 is a flowchart illustrating an example of communication between the detection apparatus and the notification control apparatus in the first embodiment of the present disclosure.
Figure 14:
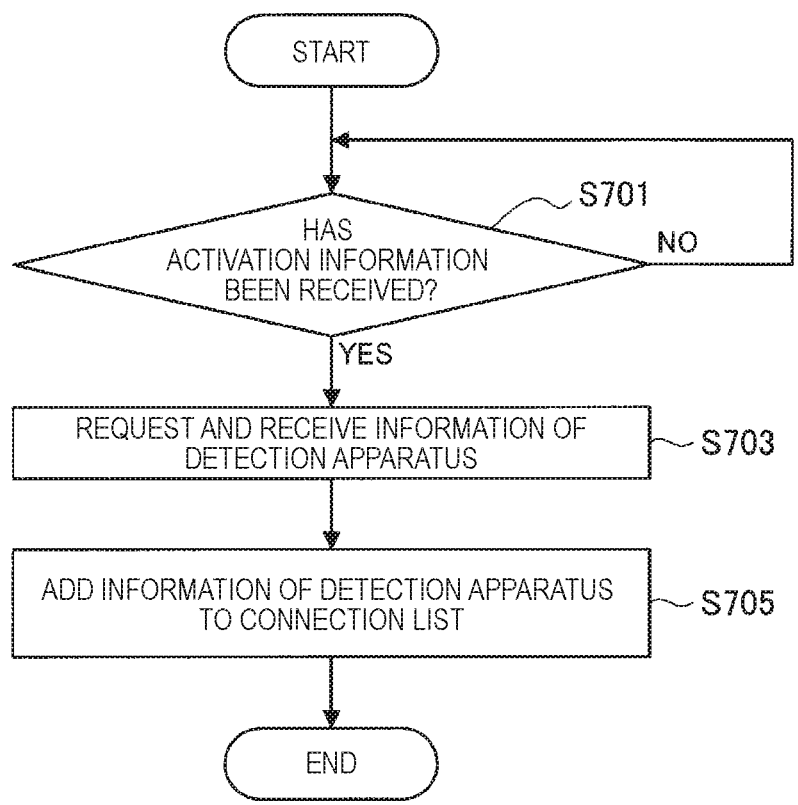
FIG. 14 is a flowchart illustrating an example of operation of the notification control apparatus in the first embodiment of the present disclosure.
Figure 15:
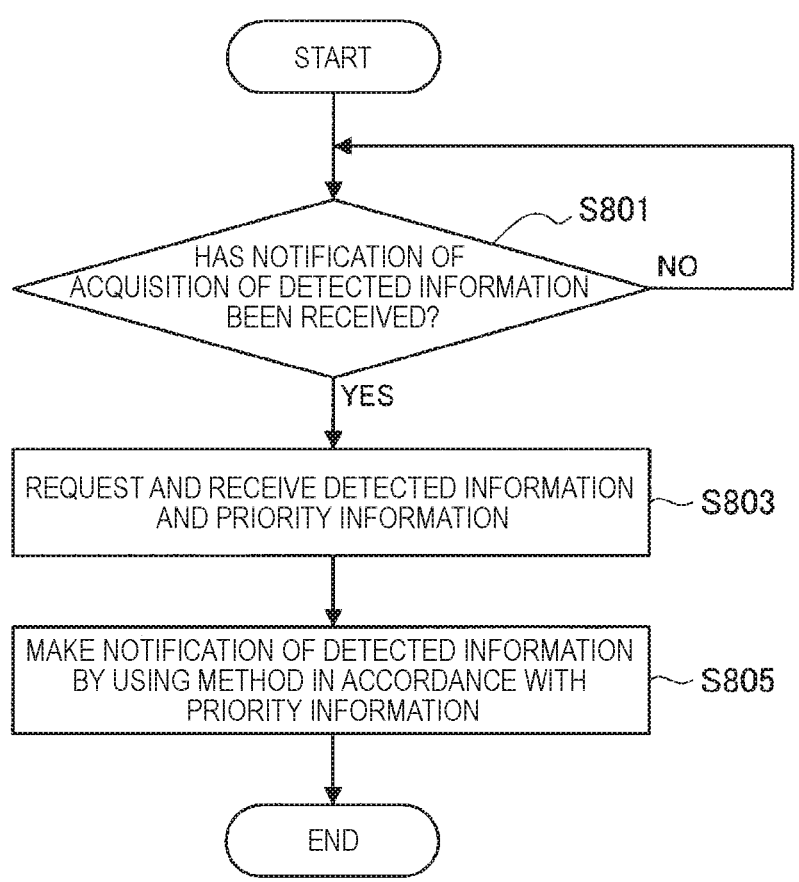
FIG. 15 is a flowchart illustrating an example of operation of the notification control apparatus in the first embodiment of the present disclosure.

Flow of operation of the above-described detection apparatus and the notification control apparatus will be described next. FIG. 13 is a flowchart illustrating an example of communication between the detection apparatus and the notification control apparatus in the present embodiment. FIG. 14 and FIG. 15 are flowcharts illustrating an example of operation of the notification control apparatus in the present embodiment.

While connection between the detection apparatus 100A and the notification control apparatus 200 is not particularly limited, the connection is performed, for example, using universal plug and play (UPnP) protocol. Examples of technical standards complying with UPnP can include, digital living network alliance (DLNA) guideline, ViiV, Plays For Sure, or the like, and the above-described connection may be performed on the basis of these technical standards. Particularly, the DLNA guideline has an advantage because there are a number of electronic apparatuses which support the DLNA guideline.

Further, typically, in a relatively small network such as, for example, a home network, disconnection and connection of electronic apparatuses are frequently performed. Therefore, in connection in the home network 300, it is preferable to employ the UPnP protocol and technical standards which comply with the UPnP protocol.

While communication between the detection apparatus 100A and the notification control apparatus 200 is not particularly limited, the communication is performed using, for example, hypertext transfer protocol (HTTP) protocol.

When the detection apparatus 100A is activated, the detection apparatus 100A first issues UPnP SSDP as a broadcast signal on the home network 300 as activation information of the detection apparatus 100A, and the notification control apparatus 200 receives UPnP SSDP (S601, S701). By this means, the notification control apparatus 200 can recognize existence of the detection apparatus 100A.

Then, the notification control apparatus 200 requests for information of the detection apparatus 100A using an HTTP GET method (S603). In response to this, the detection apparatus 100A transmits information relating to the detection apparatus 100A, for example, information relating to the detecting unit to the notification control apparatus 200 as HTTP Response (S605). By this means, the notification control apparatus 200 acquires the information relating to the detection apparatus 100A (S703).

Then, the notification control apparatus 200 adds the information relating to the detection apparatus 100A to a connection list and stores the connection list in the storage unit 212 (S705). As described above, initial connection between the notification control apparatus 200 and the detection apparatus 100A upon activation of the detection apparatus 100A is performed. Note that initial connection is performed in a similar manner between the detection apparatuses 100B to 100G and the notification control apparatus 200.

Subsequently, the notification control apparatus 200 stands by until notification regarding acquisition of the detected information is received from the detection apparatuses 100A to 100G (S801, No). Note that the notification control apparatus 200 performs normal operation as a television receiver while in a stand-by state.

Subsequently, one of the detection apparatuses 100A to 100G, in the flowchart in FIG. 13, the detection apparatus 100A, acquires the detected information. Subsequently, the detection apparatus 100A notifies the notification control apparatus 200 of acquisition of the detected information through UPnP Action as a unicast signal (S607). In response to this, the notification control apparatus 200 receives notification regarding acquisition of the detected information from the detection apparatus 100A (S801, Yes). After reception, the notification control apparatus 200 requests for the detected information and the priority information to the detection apparatus 100A using the HTTP GET method (S609). In response to this, the detection apparatus 100A transmits the detected information and the priority information to the notification control apparatus 200 as HTTP Response (S611), and the notification control apparatus 200 receives the detected information and the priority information (S803).

The notification control unit 204 of the notification control apparatus 200 controls the display unit 206 and the speaker 208 so as to notify the user of the detected information using a method in accordance with the priority included in the priority information. As a result, the user is notified of the detected information through the display unit 206 and the speaker 208 (S805).

2. Second Embodiment

A second embodiment of the present disclosure will be described in detail below with reference to FIG. 16 to FIG. 20. The notification control system according to the present embodiment differs from the notification control system according to the first embodiment in that the notification control apparatus is a smartphone which can exist outside and can connect with the home network via a wide area network (WAN), and at least one detection apparatus includes a priority setting unit. In the following description, differences between the present embodiment and the first embodiment will be mainly described, and description regarding similar matters will be omitted.

Figure 16:
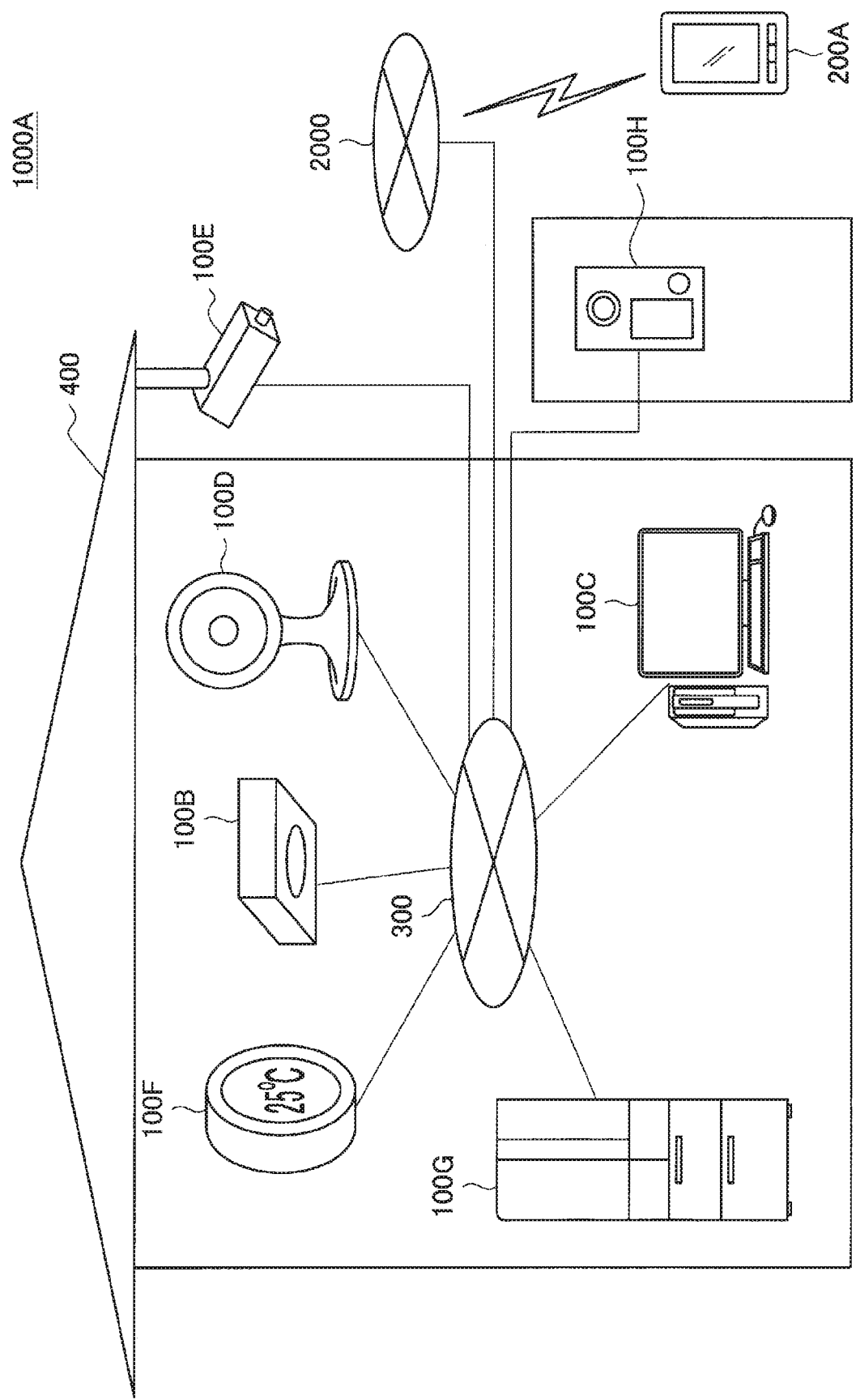
FIG. 16 is a schematic diagram illustrating appearance of a notification control system according to a second embodiment of the present disclosure.
Figure 17:
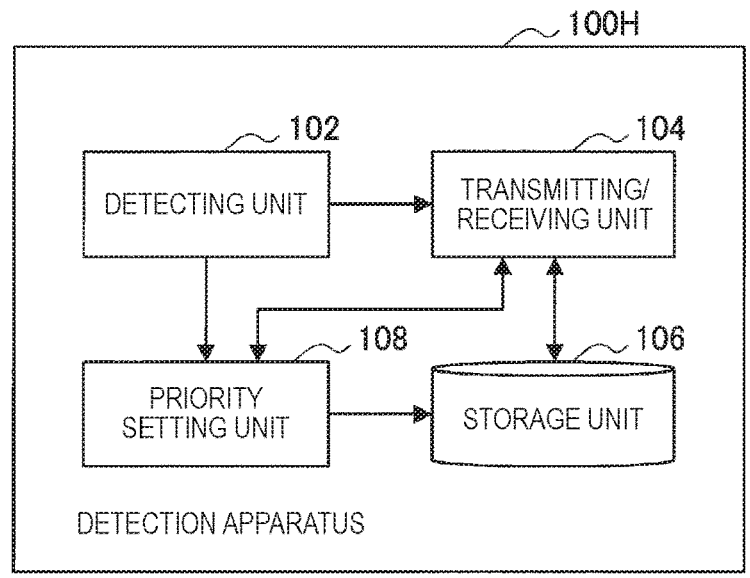
FIG. 17 is a block diagram illustrating main components of a detection apparatus according to the second embodiment of the present disclosure.
Figure 18:
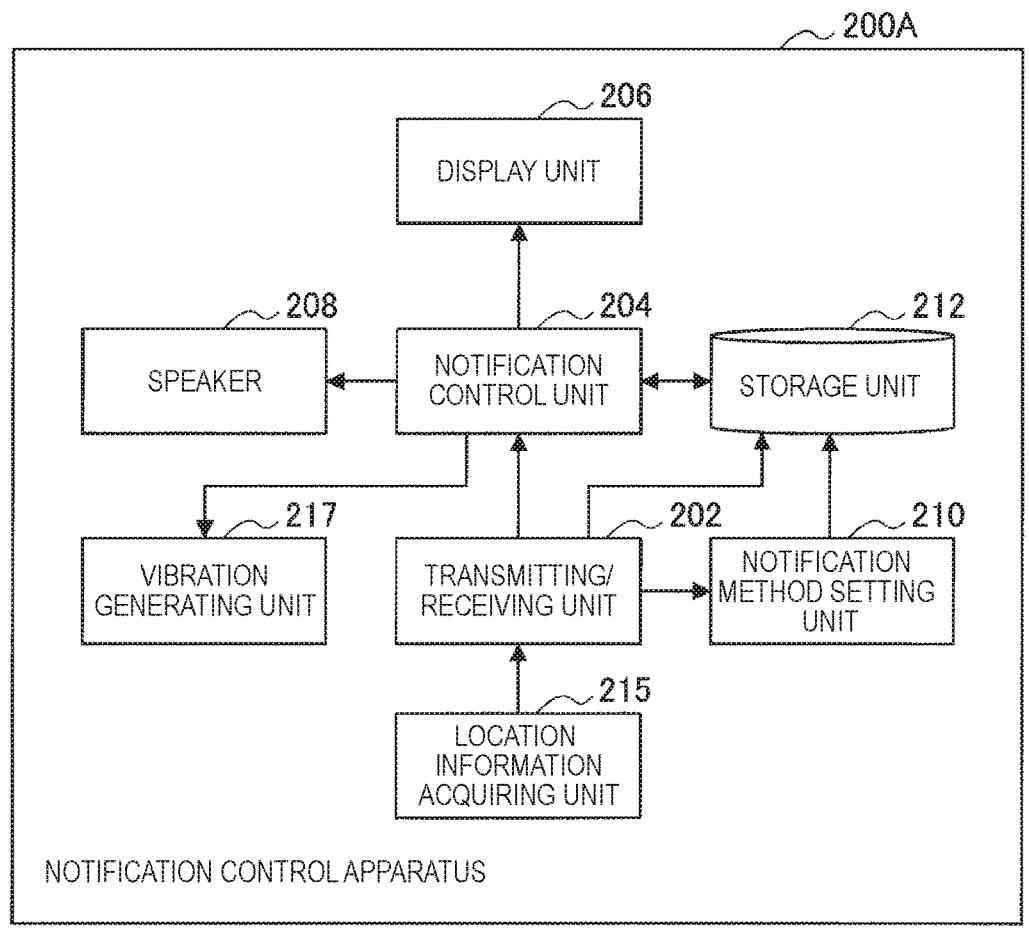
FIG. 18 is a block diagram illustrating main components of a notification control apparatus according to the second embodiment of the present disclosure.
Figure 19:
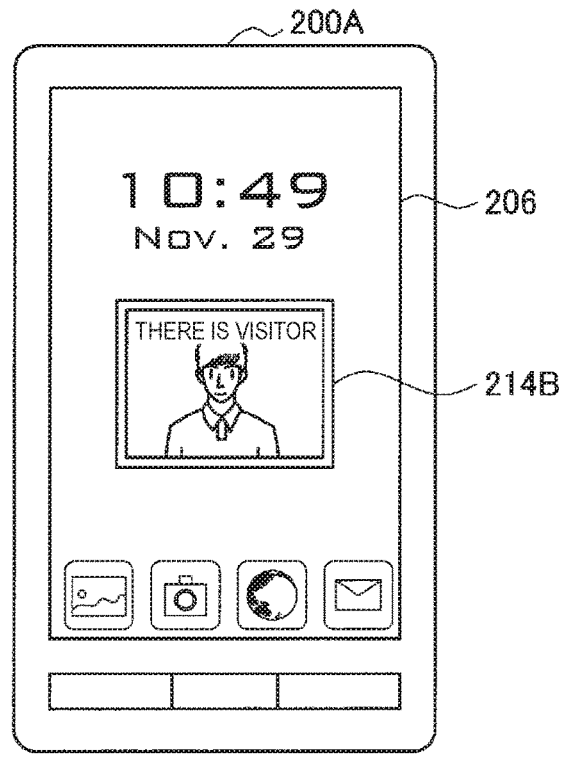
FIG. 19 is a diagram illustrating an example of display of detected information according to the second embodiment of the present disclosure.
Figure 20:
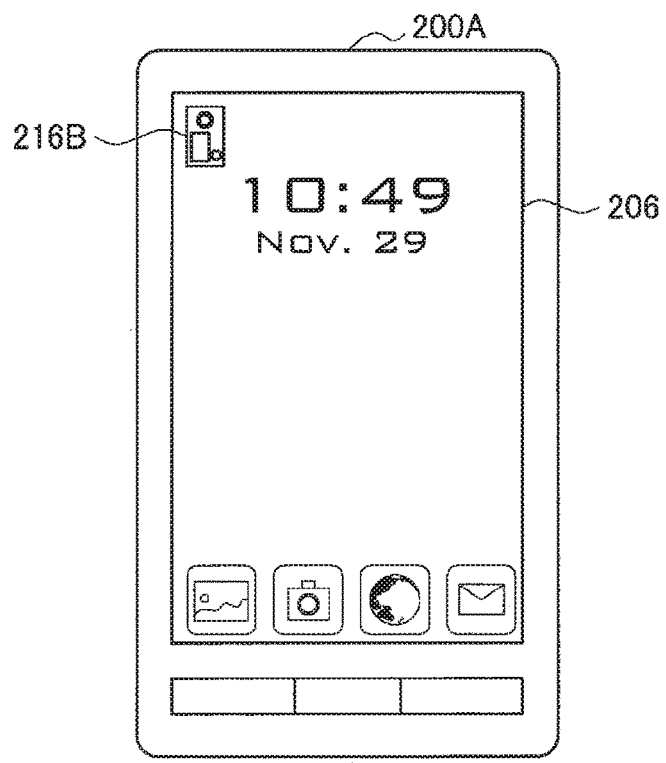
FIG. 20 is a diagram illustrating an example of display of detected information according to the second embodiment of the present disclosure.

FIG. 16 is a schematic diagram illustrating appearance of the notification control system according to the second embodiment of the present disclosure, FIG. 17 is a block diagram illustrating main components of the detection apparatus according to the second embodiment of the present disclosure, FIG. 18 is a block diagram illustrating main components of the notification control apparatus according to the second embodiment of the present disclosure, and FIG. 19 and FIG. 20 are diagrams illustrating an example of display of the detected information in the second embodiment of the present disclosure.

The detection apparatus 100H illustrated in FIG. 17 is an intercom and includes a priority setting unit 108 in addition to the above-described components of the detection apparatus 100A. The priority setting unit 108 acquires the detected information detected at the detecting unit 102, selects priority corresponding to property of the detected information and inputs the priority in the transmitting/receiving unit 104.

Alternatively, the priority setting unit 108 acquires information relating to conditions of the notification control apparatus 200A from the notification control apparatus 200A via the transmitting/receiving unit 104. Then, the priority setting unit 108 sets priority in accordance with the information relating to the conditions of the notification control apparatus 200 and causes the priority to be stored in the storage unit 106. Note that, while the information relating to the conditions of the notification control apparatus 200 is not particularly limited, examples of the information relating to the conditions of the notification control apparatus 200 can include, for example, location information of the notification control apparatus 200A, a period of time, date and time, and information relating to a state of a user who uses the notification control apparatus 200A.

Further, the notification control apparatus 200A illustrated in FIG. 18 includes a location information acquiring unit 215 and a vibration generating unit 217 in addiction to the above-described components of the notification control apparatus 200.

The location information acquiring unit 215 is an apparatus, for example, a global positioning system (GPS), which can acquire location information of the notification control apparatus 200A. The location information acquiring unit 215 inputs the acquired location information of the notification control apparatus 200A to the transmitting/receiving unit 202. The transmitting/receiving unit 202 transmits the received location information of the notification control apparatus 200A to each detection apparatus 100H via the wide area network 2000 and the home network 300. Note that the location information acquiring unit 215 may judge and acquire the location information of the notification control apparatus 200A on the basis of, for example, an access point of the wide area network 2000 to which the notification control apparatus 200A is connected and a base station. Further, the location information acquiring unit 215 may judge and acquire the location information in accordance with whether the notification control apparatus 200A is connected to the wide area network 2000 and/or is connected to the home network 300.

The vibration generating unit 217 is configured with an apparatus which can generate vibration using a motor, or the like. The vibration generating unit 217 generates vibration in accordance with a control instruction by the notification control unit 204 to vibrate the notification control apparatus 200A. By this means, it is possible to notify the user through generation of vibration.

In the notification control system 1000A as described above, the priority setting unit 108 of the detection apparatus 100H can, for example, change the priority of the detected information in accordance with the location information of the notification control apparatus 200A. This will be specifically described below.

For example, the location information acquiring unit 215 of the notification control apparatus 200A regularly acquires the location information of the notification control apparatus 200A. The acquired location information is transmitted to the detection apparatus 100H via at least the home network 300 from the notification control apparatus 200A. The priority setting unit 108 of the detection apparatus 100H which acquires the location information sets priority 2 for the detected information in the case where the notification control apparatus 200A is located near the house 400, and sets priority 3 for the detected information in the case where the notification control apparatus 200A is not located near the house.

As described above, the detection apparatus 100H is an intercom. Therefore, while, in the case where the user is located near the house 400, it is necessary to immediately respond, in the case where the user is not located near the house 400, it is impossible to immediately respond. Therefore, the priority of call information at the entrance of the intercom is changed in accordance with a location where the user who carries the notification control apparatus 200A is located.

Therefore, in the case where the user who carries the notification control apparatus 200A is located near the house 400, the notification control apparatus 200A which receives the call information at the entrance from the detection apparatus 100H displays the information in a window image 214B of the display unit 206 as illustrated in FIG. 19. On the other hand, in the case where the user who carries the notification control apparatus 200A is not located near the house 400, the notification control apparatus 200A which receives the call information at the entrance displays the same information as an icon image 216B at the display unit 206 as illustrated in FIG. 20. Note that, in the both cases, the notification control unit 204 may perform control to generate sound such as sound effect and/or vibration at the speaker 208 and/or the vibration generating unit 217.

3. Modified Examples

The embodiments of the present disclosure have been described above. Some modified examples of the above-described embodiments of the present disclosure will be described below. Note that, each modified example described below may be independently applied to the above-described embodiments of the present disclosure or may be applied to the above-described embodiments of the present disclosure in combination with one another. Further, each modified example may be applied in place of the configuration described in the above-described embodiments of the present disclosure or may be additionally applied to the configuration described in the above-described embodiments of the present disclosure.

First Modified Example

While, in the above-described embodiments, the notification control apparatuses 200 and 200A include the display unit 206 and the speaker 208 as notifying units, the notification control apparatus according to the present disclosure does not have to include a notifying unit. In such a case, the notification control system according to the present disclosure can separately include notification apparatuses such as a display and a speaker.

Second Modified Example

Further, while, in the above-described embodiments, the notification control apparatuses 200 and 200A are respectively a television receiver and a smartphone, the notification control apparatus according to the present disclosure is not limited to this. The notification control apparatus according to the present disclosure can be, for example, a television receiver, a tablet terminal, a PDA terminal, a desktop computer, a mobile computer, a disk player, a disk recorder, a mobile phone or a smartphone.

Third Modified Example

Further, while, in the above-described embodiments, the priority information is transmitted along with the detected information, the present disclosure is not limited to this. The priority information can be, for example, transmitted separately from transmission of the detected information. For example, the priority information may be transmitted when the detection apparatus is connected to the home network, and information of the detection apparatus is transmitted from the notification control apparatus.

Fourth Modified Example

Further, while, in the above-described embodiments, the detection apparatuses 100A to 100H directly transmit the priority information to the notification control apparatuses 200 and 200A, the present disclosure is not limited to this. For example, the notification control system may include a database server which manages the priority information. In such a case, the detection apparatus can request the database server to transmit the priority information corresponding to the detected information detected by the detection apparatus to the notification control apparatus. By this means, it becomes possible to indirectly transmit the priority information from the detection apparatus to the notification control apparatus via the database server.

4. Hardware Configuration of Detection Apparatus

Figure 21:
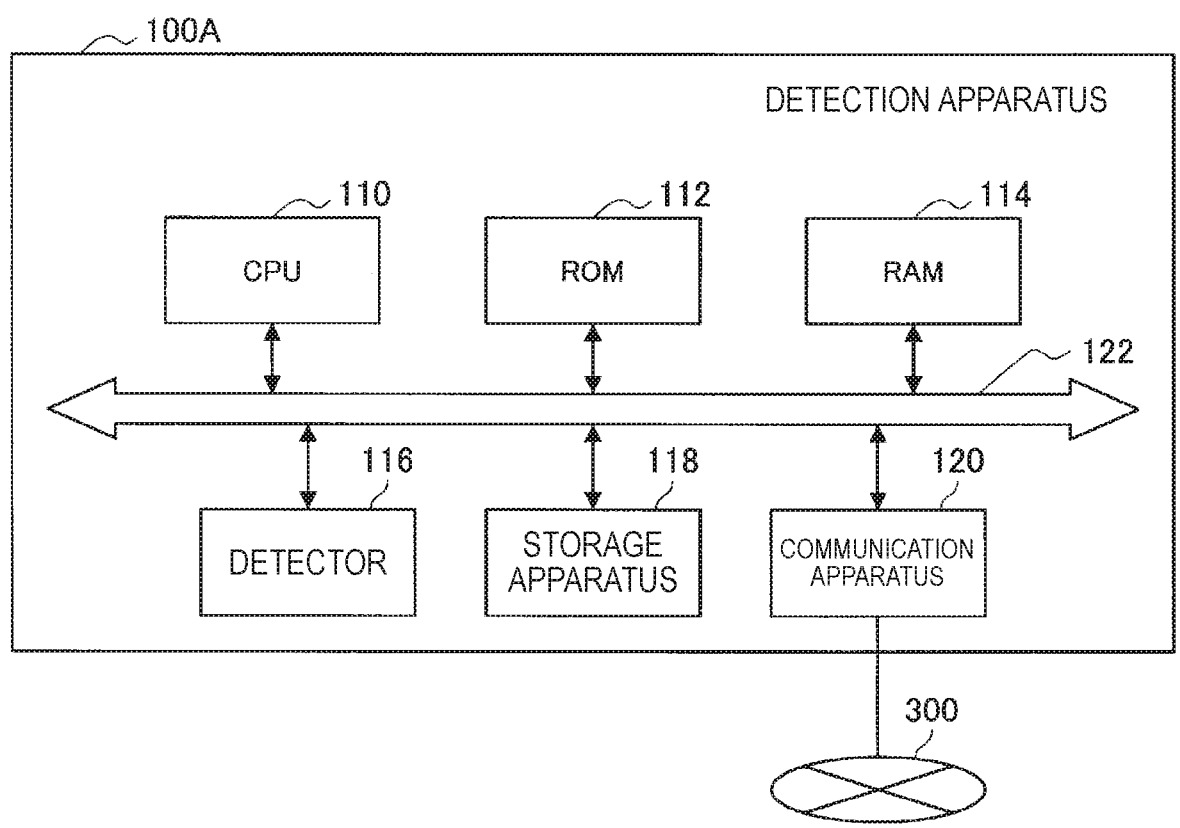
FIG. 21 is a block diagram illustrating a hardware configuration of the detection apparatus illustrated in FIG. 1.

A hardware configuration of the detection apparatus 100A will be described next as a representative for a hardware configuration of the above-described detection apparatuses 100A to 100H. FIG. 21 is a block diagram illustrating the hardware configuration of the detection apparatus 100A illustrated in FIG. 1. The detection apparatus 100A includes a CPU 110, a ROM 112, a RAM 114, a detector 116, a storage apparatus 118 and a communication apparatus 120.

The CPU 110, which is a processor functioning as an arithmetic processing unit and a control apparatus, controls the whole operation within the detection apparatus 100A or part of the operation within the detection apparatus 100A in accordance with various kinds of programs stored in the ROM 112, the RAM 114 and the storage apparatus 118. The ROM 112 stores a program, an operation parameter, or the like, to be used by the CPU 110. The RAM 114 temporarily stores a program to be used by the CPU 110, a parameter, or the like, which changes as appropriate during execution of the program. The CPU 110, the ROM 112 and the RAM 114 are connected to one another through a host bus 122 configured with an internal bus such as a CPU bus.

The detector 116, which is a CMOS or CCD camera, inputs a captured image to the storage apparatus 118 or the CPU 110. The detector 116, which is a sensor camera which can detect a moving object in the captured image, constitutes at least part of the detecting unit 102. The storage apparatus 118 is an apparatus for data storage configured as an example of the storage unit. The storage apparatus 118 is configured with, for example, a magnetic storage unit device such as a hard disk drive (HDD), a semiconductor storage device, an optical storage device, a magneto-optical storage device, or the like. This storage apparatus 118 stores a program to be executed by the CPU 110, various kinds of data, and various kinds of data, or the like, acquired from outside.

The communication apparatus 120 is, for example, a communication interface configured with a communication device, or the like, for connecting to the home network 300. The communication apparatus 120 is, for example, a communication card, or the like, for wired or wireless local area network (LAN), Bluetooth (registered trademark), or wireless USB (WUSB). This communication apparatus 120 can, for example, transmit/receive a signal, or the like, to/from the Internet or other communication equipment in accordance with predetermined protocol such as, for example, TCP/IP.

An example of the hardware configuration which can realize functions of the detection apparatus 100A according to an embodiment of the present disclosure has been described above. The above-described each component may be configured using a versatile member or may be configured with hardware dedicated to function of each component. Further, it goes without saying that the detection apparatus 100A has other hardware components necessary as an intercom. Still further, it is possible to change hardware components to be utilized as appropriate in accordance with each technical level at which the present embodiment is implemented.

By cooperation between the hardware and the software of the detection apparatus 100A described above, for example, functions of the detecting unit 102, the transmitting/receiving unit 104 and the storage unit 106 are realized.

Note that hardware configurations of the detection apparatuses 100B to 100H can be made configurations similar to that of the detection apparatus 100A except that the configuration of the detector is changed in accordance with information to be detected as appropriate. Further, by cooperation between the hardware configurations and the software of the detection apparatuses 100B to 100H, each function of the detection apparatuses 100B to 100H is realized.

5. Hardware Configuration of Notification Control Apparatus

Figure 22:
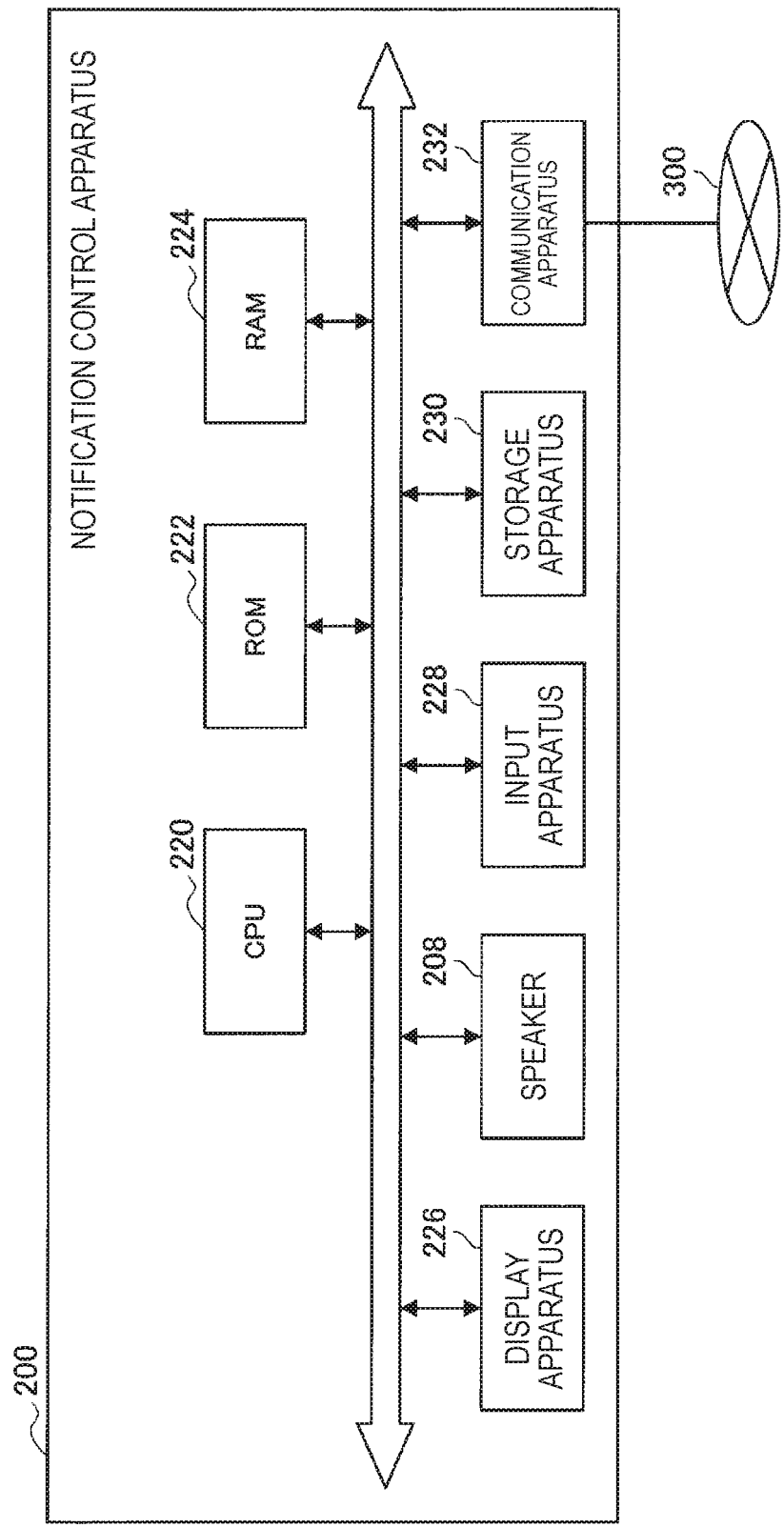
FIG. 22 is a block diagram illustrating a hardware configuration of the notification control apparatus illustrated in FIG. 1.
Figure 23:
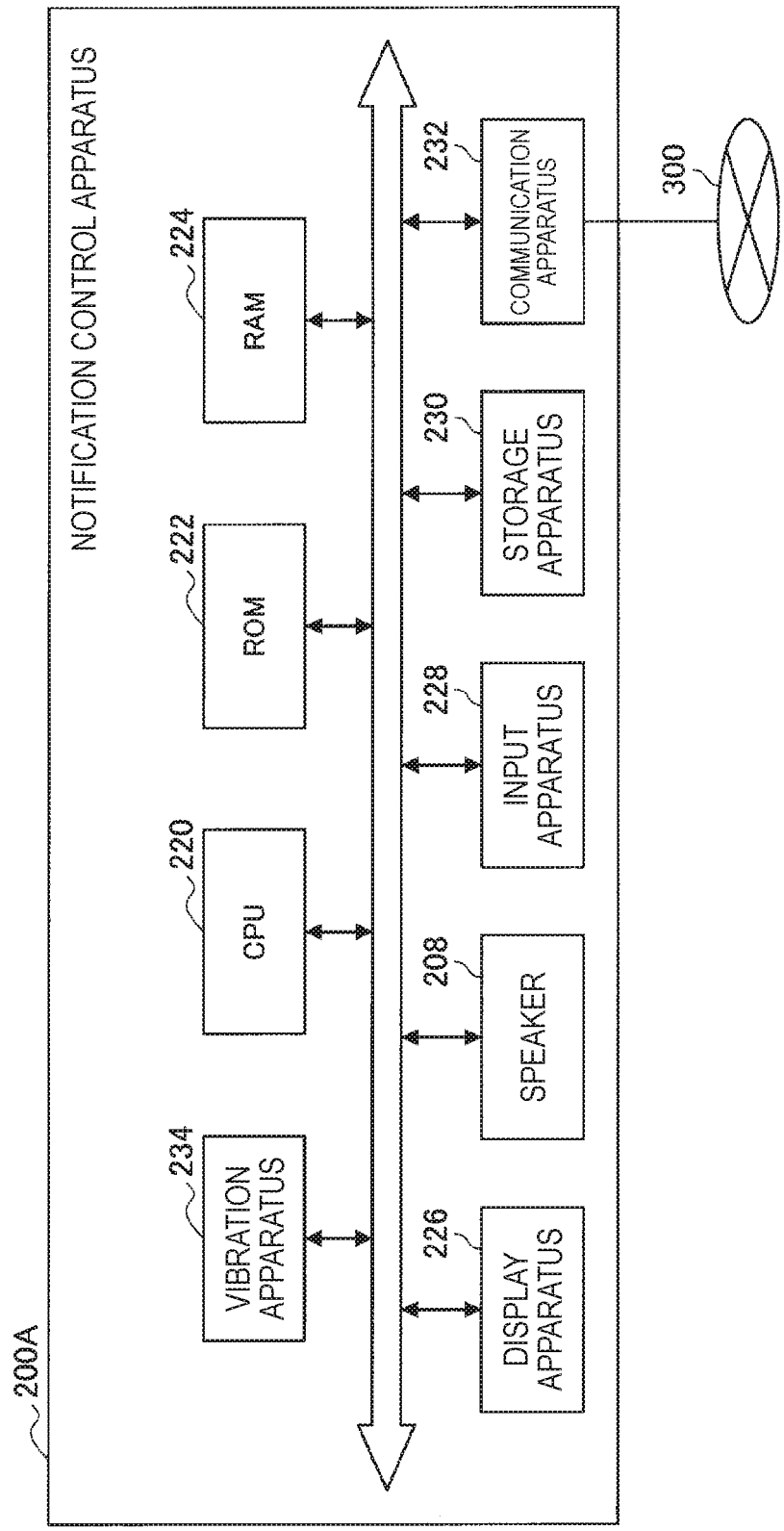
FIG. 23 is a block diagram illustrating a hardware configuration of the notification control apparatus illustrated in FIG. 16.

Hardware configurations of the notification control apparatus 200 and 200A will be described next. FIG. 22 is a block diagram illustrating the hardware configuration of the notification control apparatus 200 illustrated in FIG. 1, and FIG. 23 is a block diagram illustrating the hardware configuration of the notification control apparatus 200A illustrated in FIG. 16.

First, the notification control apparatus 200 will be described. As illustrated in FIG. 22, the notification control apparatus 200 includes a CPU 220, a ROM 222, a RAM 224, a display apparatus 226, a speaker 208, an input apparatus 228, a storage apparatus 230 and a communication apparatus 232. Because configurations of the CPU 220, the ROM 222, the RAM 224 and the storage apparatus 230 are similar to the configurations of the CPU 110, the ROM 112, the RAM 114 and the storage apparatus 118 described above, description will be omitted. Further, the speaker 208 has been described above.

The display apparatus 226 is an apparatus which can visually notify the user of the acquired information. The display apparatus 226 constitutes the display unit 206. The display apparatus 226 can be, for example, a CRT display apparatus, a liquid crystal display apparatus, a plasma display apparatus, an EL display apparatus, a lamp, or the like.

The input apparatus 228 is, for example, operation means such as a mouse, a keyboard, a touch panel, a button, a switch and a lever operated by the user. Further, the input apparatus 228 may be, for example, remote control means (so-called a remote controller) utilizing infrared light or other radio waves, or may be external connection equipment such as a mobile phone and a PDA which supports operation of the notification control apparatus 200. Still further, the input apparatus 228 is, for example, configured with an input control circuit, or the like, which generates an input signal on the basis of information input by the user using the above-described operation means and outputs the input signal to the CPU 220. The user of the notification control apparatus 200 can input various kinds of data to the notification control apparatus 200 or instructs the notification control apparatus 200 to perform processing operation by operating this input apparatus 228.

The communication apparatus 232 includes a communication device for connecting to a wired and/or wireless wide area network (WAN) as needed in addition to the above-described components of the communication apparatus 120.

By cooperation between the hardware and the software of the notification control apparatus 200 described above, for example, functions of the transmitting/receiving unit 202, the notification control unit 204, the display unit 206, the speaker 208, the notification method setting unit 210, the storage unit 212, the location information acquiring unit 215 and the vibration generating unit 217 are realized.

Further, as illustrated in FIG. 23, the notification control apparatus 200A includes a vibration apparatus 234 in addition to each hardware configuration of the notification control apparatus 200. The vibration apparatus 234 is an apparatus for generating vibration, which constitutes the vibration generating unit 217. The vibration apparatus 234 can generate vibration by, for example, rotation of a motor having an eccentric mass, or the like.

By cooperation between the hardware and the software of the notification control apparatus 200A described above, for example, functions of the transmitting/receiving unit 202, the notification control unit 204, the display unit 206, the speaker 208, the notification method setting unit 210, the storage unit 212, the location information acquiring unit 215 and the vibration generating unit 217 are realized.

6. Computer Program

It is also possible to create a computer program for causing hardware of the above-described each apparatus on the notification control systems 1000 and 1000A and hardware such as, for example, the CPU 110, the ROM 112, the RAM 114 and the storage apparatus 118 incorporated into the detection apparatus 100A to exert functions of the above-described each apparatus. Particularly, by the detection apparatus 100A downloading and installing the computer program, functions of the detecting unit 102, the transmitting/receiving unit 104, the storage unit 106, or the like, may be implemented on the detection apparatus 100A. Further, a storage medium in which the computer program is stored is provided.

Further, it is also possible to create a computer program for causing hardware such as, for example, the CPU 220, the ROM 222, the RAM 224 and the storage apparatus 230 incorporated into the notification control apparatus 200 to exert functions of the above-described each apparatus. Particularly, by the notification control apparatus 200 downloading and installing the computer program, functions of the notification control unit 204, the notification method setting unit 210, the storage unit 212, or the like, may be implemented on the notification control apparatus 200. Further, a storage medium in which the computer program is stored is provided.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A notification control apparatus including:

a receiving unit configured to receive detected information detected by a detection apparatus connected to a home network and priority information associated with the detected information from the detection apparatus via the home network; and a notification control unit configured to control notification to a user by using a method in accordance with the priority information.

(2)

The notification control apparatus according to (1), in which the notification is made through display of an image, generation of a sound wave and/or vibration.

(3)

The notification control apparatus according to (1) or (2), in which, in a case where the priority information includes first priority, the notification control unit controls the notification to the user such that an image relating to the detected information or an image indicating existence of the detected information is displayed on part of a screen of a display apparatus for performing the notification.

(4)

The notification control apparatus according to (3), in which, in a case where the priority information includes second priority which is higher priority than the first priority, the notification control unit controls the notification to the user such that an image relating to the detected information which is larger than the image to be displayed in a case where the priority information includes the first priority is displayed in a display screen of the display apparatus for performing the notification.

(5)

The notification control apparatus according to (3) or (4), in which, in a case where the priority information includes third priority which is lower priority than the first priority, the notification control unit controls the notification to the user such that the image relating to the detected information is displayed on the display apparatus for performing the notification when the receiving unit receives a request for display from the user.

(6)

The notification control apparatus according to any one of (1) to (5), in which, in a case where the receiving unit receives a plurality of pieces of the detected information.

the notification control unit controls the notification to the user such that an image relating to a piece of detected information with higher priority is displayed at a larger size than a size of an image relating to a piece of detected information with lower priority.

(7)
The notification control apparatus according to any one of (1) to (6),
in which, in a case where the receiving unit receives a plurality of pieces of the detected information and priorities included in the priority information corresponding to the plurality of pieces of the detected information are same, the notification control unit controls the notification to the user such that images of the plurality of pieces of the detected information are displayed in parallel.

(8)
The notification control apparatus according to any one of (1) to (6),
in which the notification control unit is configured to be able to change a method for notifying the user.

(9)
The notification control apparatus according to any one of (1) to (8),
in which the notification control apparatus is a television receiver, a tablet terminal, a PDA terminal, a desktop computer, a mobile computer, a disk player, a disk recorder, a mobile phone, or a smartphone.

(10)
A notification control method including:
receiving detected information detected by a detection apparatus connected to a home network and priority information associated with the detection apparatus from the detection apparatus via the home network; and
controlling notification to a user by a processor using a method in accordance with the priority information.

(11)
A detection apparatus including:
a detecting unit configured to detect information of surroundings as detected information; and
a transmitting unit connected to a home network and configured to transmit the detected information and priority information associated with the detected information to a notification control apparatus via the home network,
in which the notification control apparatus is configured to control notification of the detected information to the user by using a method in accordance with the priority information.

(12)
The detection apparatus according to (11), further including:
a priority setting unit configured to change the priority information in accordance with content of the detected information.

(13)
The detection apparatus according to (11) or (12),
in which the transmitting unit is connected to the notification control apparatus by using Universal Plug and Play (UPnP) protocol.

(14)
A detection method including:
detecting information of surroundings as detected information by a detecting unit; and
transmitting the detected information and priority information associated with the detected information to a notification control apparatus via a home network,
in which the notification control apparatus is configured to control notification of the detected information to a user by using a method in accordance with the priority information.

(15)
A notification control system including:
a home network;
one or more detection apparatuses configured to detect information of surroundings as detected information and transmit the detected information and priority information associated with the detected information to the home network; and
a notification control apparatus configured to receive the detected information from the detection apparatus via the home network and control notification to a user by using a method in accordance with the priority information.

REFERENCE SIGNS LIST 100A, 100B, 100C, 100D, 100E, 100F, 100G, 100H detection apparatus
102 detecting unit
104 transmitting/receiving unit
106 storage unit
108 priority setting unit
110 CPU
112 ROM
114 RAM
116 detector
118 storage apparatus
120 communication apparatus
122 host bus
200, 200A notification control apparatus
202 transmitting/receiving unit
204 notification control unit
206 display unit
208 speaker
210 notification method setting unit
212 storage unit
214, 214A, 214B window image
215 location information acquiring unit
216, 216A, 216B icon image
217 vibration generating unit
218A, 218B divided screen
220 CPU
222 ROM
224 RAM
226 display apparatus
228 input apparatus
230 storage apparatus
232 communication apparatus
234 vibration apparatus
300 home network
400 house
1000, 1000A notification control system
2000 wide area network

The invention claimed is:
1. A notification control apparatus, comprising:
a location information acquiring unit configured to acquire a location of the notification control apparatus;
a transmitting unit configured to transmit the acquired location of the notification control apparatus to a detection apparatus;
a receiving unit configured to receive detected information detected by the detection apparatus and priority information associated with the detection apparatus, wherein
the priority information associated with the detection apparatus is based on the transmitted location of the notification control apparatus,
the detection apparatus is connected to a home network,
the detected information is information of surroundings associated with the detection apparatus, and each of the detected information and the priority information is received from the detection apparatus via the home network; and
a notification control unit configured to control notification of the detected information based on the priority information associated with the detection apparatus.

2. The notification control apparatus according to claim 1, wherein the notification is based on at least one of display of an image, generation of a sound wave, or generation of a vibration.

3. The notification control apparatus according to claim 1, wherein
the notification control unit is further configured to control the notification based on inclusion of a first priority in the priority information associated with the detection apparatus, and
the notification includes display of at least one of a first image related to the detected information or a second image that indicates existence of the detected information, on a part of a screen of a display apparatus.

4. The notification control apparatus according to claim 3, wherein
the notification control unit is further configured to control the notification based on inclusion of a second priority in the priority information,
the second priority is higher than the first priority,
the notification includes display of a third image related to the detected information on the screen of the display apparatus, and
the third image is larger than the first image.

5. The notification control apparatus according to claim 3, wherein
the receiving unit is further configured to receive a display request associated with a user,
the notification control unit is further configured to control the notification based on inclusion of a second priority in the priority information, and
the notification includes display of the first image on the display apparatus based on the reception of the display request.

6. The notification control apparatus according to claim 1, wherein
the receiving unit is further configured to receive a plurality of pieces of the detected information,
the notification control unit is further configured to control the notification based on the reception of the plurality of pieces of the detected information,
the notification includes display of a first image related to a first piece of the plurality of pieces of the detected information and a second image related to a second piece of the plurality of pieces of the detected information,
the first piece of the detected information is associated with a first priority,
the second piece of the detected information is associated with a second priority, and
the first priority is higher than the second priority.

7. The notification control apparatus according to claim 1, wherein
the receiving unit is further configured to receive a plurality of pieces of the detected information,
the priority information includes a plurality of priorities corresponding to the plurality of pieces of the detected information,
a first priority of the plurality of priorities is same as a second priority of the plurality of priorities, the notification control unit is further configured to control the notification based on the reception of the plurality of pieces of the detected information and the plurality of priorities, and
the notification includes display of a plurality of images of the plurality of pieces of the detected information in parallel.

8. The notification control apparatus according to claim 1, wherein the notification control unit is further configured to change a method of the notification.

9. The notification control apparatus according to claim 1, wherein the notification control apparatus is one of a television receiver, a tablet terminal, a PDA terminal, a desktop computer, a mobile computer, a disk player, a disk recorder, a mobile phone, or a smartphone.

10. A notification control method, comprising:
acquiring a location of a notification control apparatus;
transmitting the acquired location to a detection apparatus;
receiving detected information detected by the detection apparatus and priority information associated with the detection apparatus, wherein
the priority information associated with the detection apparatus is based on the transmitted location of the notification control apparatus,
the detection apparatus is connected to a home network,
the detected information is information of surroundings associated with the detection apparatus, and
each of the detected information and the priority information is received from the detection apparatus via the home network; and
controlling notification of the detected information based on the priority information associated with the detection apparatus.

11. A detection apparatus, comprising:
a priority setting unit configured to receive a location of a notification control apparatus;
a detecting unit configured to detect information of surroundings of the detection apparatus; and
a transmitting unit configured to:
connect to a home network; and
transmit the detected information and priority information associated with the detection apparatus to the notification control apparatus via the home network, wherein
the priority information associated with the detection apparatus is based on the received location of the notification control apparatus, and
the notification control apparatus controls notification of the detected information based on the priority information associated with the detection apparatus.

12. The detection apparatus according to claim 11, wherein the priority setting unit is further configured to change the priority information based on content of the detected information.

13. The detection apparatus according to claim 11, wherein the transmitting unit is further configured to connect to the notification control apparatus based on a Universal Plug and Play (UPnP) protocol.

14. A detection method, comprising:
in a detection apparatus:
receiving a location of a notification control apparatus;
detecting information of surroundings associated with the detection apparatus; and transmitting the detected information and priority information associated with the detection apparatus to the notification control apparatus via a home network, wherein
    the priority information associated with the detection apparatus is based on the received location of the notification control apparatus, and
    the notification control apparatus controls notification of the detected information based on the priority information associated with the detection apparatus.

15. A notification control system, comprising:

a home network;

a notification control apparatus; and at least one detection apparatus configured to:
  receive a location of the notification control apparatus;
  detect information of surroundings associated with the at least one detection apparatus; and
  transmit the detected information and priority information associated with the at least one detection apparatus to the home network, wherein
    the priority information associated with the at least one detection apparatus is based on the received location of the notification control apparatus, and
    the notification control apparatus is configured to:
      receive the detected information and the priority information from the at least one detection apparatus via the home network; and
      control notification of the detected information based on the priority information associated with the at least one detection apparatus.

\* \* \* \* \*